US012704280B2

(12) United States Patent
Chan et al.

(10) Patent No.: US 12,704,280 B2
(45) Date of Patent: Aug. 11, 2026

(54) METHOD AND SYSTEM FOR MONITORING AN ENVIRONMENTAL CONTROL SYSTEM USING A MOBILE DEVICE

(71) Applicant: Honeywell International Inc., Charlotte, NC (US)

(72) Inventors: FoongYeen Chan, Petaling Jaya (MY); Liwen Yu, Acton, MA (US); Nagasree Poluri, Bangalore (IN); Seth Laporta, Waltham, MA (US); Wei Hua, Acton, MA (US); James Barrette, Ashburnham, MA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 305 days.

(21) Appl. No.: 18/630,755

(22) Filed: Apr. 9, 2024

(65) Prior Publication Data

US 2025/0314391 A1 Oct. 9, 2025

(51) Int. Cl.

| | |
|---|---|
| ***F24F 11/52*** | (2018.01) |
| ***B08B 15/02*** | (2006.01) |
| ***F24F 11/54*** | (2018.01) |
| ***F24F 11/56*** | (2018.01) |
| ***F24F 11/74*** | (2018.01) |
| ***G06F 3/0482*** | (2013.01) |

(52) U.S. Cl.

CPC .............. *F24F 11/52* (2018.01); *B08B 15/02* (2013.01); *F24F 11/54* (2018.01); *F24F 11/56* (2018.01); *F24F 11/74* (2018.01); *G06F 3/0482* (2013.01)

(58) Field of Classification Search

None

See application file for complete search history.

(56) References Cited

U.S. PATENT DOCUMENTS

| | | | |
|---|---|---|---|
| 11,121,741 | B2 | 9/2021 | Rumler et al. |
| 11,681,262 | B2 | 6/2023 | Ray et al. |
| 11,698,205 | B2 | 7/2023 | Brown et al. |
| 11,801,538 | B2 | 10/2023 | Desrochers |

(Continued)

OTHER PUBLICATIONS

Carrier, "i-Vu Building Automation System i-Vu 8.0 Pro", Catalog No. 11-808-848-01, 65 pages, Jun. 21, 2022.

(Continued)

*Primary Examiner* — Sean Shechtman

(74) *Attorney, Agent, or Firm* — Seager, Tufte & Wickhem, LLP

(57) ABSTRACT

A method includes establishing a wireless connection between a mobile device and a programmable zone controller. The mobile device executes an application program configured to communicate with the programmable zone controller. The mobile device executes an application program displaying a zone dashboard on a display of the mobile device, wherein the zone dashboard includes a plurality of critical operating parameters associated with the programmable zone controller that are retrieved from the programmable zone controller. The application program is configured to display a listing of air flow control devices that are operatively coupled to the programmable zone controller and to allow a user of the mobile device to select one of the air flow control devices from the listing of air flow control devices, and in response, display a plurality of critical operating parameters associated with the selected air flow control device.

19 Claims, 21 Drawing Sheets

(56) References Cited

U.S. PATENT DOCUMENTS

| | | | |
|---|---|---|---|
| 2013/0144445 | A1 | 6/2013 | Steinberg |
| 2015/0212714 | A1 | 7/2015 | Hua et al. |

OTHER PUBLICATIONS

Gaitan et al., "BACnet Application Layer over Bluetooth—Implementation and Validation", Sensors, vol. 21, 11 pages, Jan. 13, 2021.
Anonymous: "Fume Hood Hibernation Standard Operating Procedure | Environment, Health and Safety," XP093309115, Retrieved from the Internet: URL:https://web.archive.org/web/20220701044956/https://ehs.cornell.edu/research-safety/general-laboratory-safety/laboratory-ventilation/fume-hood-hibernation-standard-operating-procedure, Jul. 1, 2022 (4 pages).
Anonymous: "Safe & Sustainable Lab Programs—EHS," XP093309119, Retrieved from the Internet: URL:https://web.archive.org/web/20211006143431/https://ehs.mit.edu/safe-sustainablelabs/, Oct. 6, 2021 (2 pages).
Extended European Search Report, EP Application No. 25164172.6, European Patent Office, Sep. 9, 2025 (12 pages).

290

< FHD_Room3_01

Normal FHD VAV

Overview

Sash Opening Current 100%

User Status Current Present

Hood Airflow Set to 265 Current 265 cfm

Operation

I/O >

Devices

Properties >

METHOD AND SYSTEM FOR MONITORING AN ENVIRONMENTAL CONTROL SYSTEM USING A MOBILE DEVICE

TECHNICAL FIELD

The present disclosure relates generally to environmental controls and more particularly to monitoring environmental controls using a mobile device.

BACKGROUND

Buildings include a variety of environmental control devices such as air flow control devices. Variable Air Volume (VAV) devices for controlling air flow to a space are an example of an air control device. In a lab setting, fume hoods are another example of an air control device. Many such devices are currently controlled and operated using server-based supervisory software that can require expensive licenses and substantial training for a user to be proficient in running the supervisory software. Current supervisory software can require constant monitoring by one or more persons, often at a central monitoring station. What would be desirable is easy to use and understand supervisory software that can run on a mobile device such as a smartphone. What would be desirable is easy to use and understand supervisory software that can allow a user to monitor the performance of one or more air flow control devices of a space from a mobile device, and in some cases, make changes to the operation of one or more of the air flow control devices using the mobile device.

SUMMARY

The present disclosure relates generally to environmental controls and more particularly to monitoring environmental controls using a mobile device. An example may be found in a method for monitoring at least part of a space of a building, wherein the space of the building includes a plurality of devices for controlling the environment of the space including a programmable zone controller operatively coupled to a plurality of air flow control devices of the space. The illustrative method includes establishing a wireless connection between a mobile device and the programmable zone controller. The mobile device executes an application program that is configured to communicate with the programmable zone controller via the wireless connection. The application program may be configured to display a zone dashboard on a display of the mobile device, wherein the zone dashboard includes a plurality of critical operating parameters associated with the programmable zone controller that are retrieved from the programmable zone controller via the wireless connection. The application program may be configured to display a listing of air flow control devices that are operatively coupled to the programmable zone controller. The application program may be configured to allow a user of the mobile device to select one of the air flow control devices from the listing of air flow control devices, and in response, display a plurality of critical operating parameters associated with the selected air flow control device.

Another example may be found in a non-transitory computer readable medium storing instructions that when executed by one or more processors of a mobile device, causes the one or more processors of the mobile device to establish a wireless connection between the mobile device and a programmable zone controller. The one or more processors of the mobile device are caused to communicate with the programmable zone controller via the wireless connection. The one or more processors of the mobile device are caused to display a zone dashboard on a display of the mobile device, wherein the zone dashboard includes a plurality of critical operating parameters associated with the programmable zone controller that are retrieved from the programmable zone controller via the wireless connection. The one or more processors of the mobile device are caused to display a listing of air flow control devices that are operatively coupled to the programmable zone controller. The one or more processors of the mobile device are caused to reference one or more tiles for each of the air flow control devices that are operatively coupled to the programmable zone controller, wherein each of the one or more tiles are locally stored on the mobile device and define a plurality of critical operating parameters that are to be displayed in response to a user of the mobile device selecting the corresponding one of the air flow control devices from the listing of air flow control devices. In some cases, each tile includes a single critical operating parameters. The one or more processors of the mobile device are caused to allow the user of the mobile device to select one of the air flow control devices from the listing of air flow control devices, and in response, display the plurality of critical operating parameters defined by the tile that is associated with the selected air flow control device.

Another example may be found in a system that includes a programmable zone controller, a plurality of air flow control devices that are operatively coupled to the programmable zone controller via a wired connection, and a mobile device that is operatively coupled to the programmable zone controller via a wireless connection. The mobile device executes an application program that is configured to communicate with the programmable zone controller via the wireless connection. The mobile device executes an application program that is configured to display a zone dashboard on a display of the mobile device, wherein the zone dashboard includes a plurality of critical operating parameters associated with the programmable zone controller that are retrieved from the programmable zone controller via the wireless connection. In some cases, at least some of the critical operating parameters may be predetermined, but this is not required. The application program may be configured to display a listing of the plurality of air flow control devices that are operatively coupled to the programmable zone controller. The application program may be configured to allow a user of the mobile device to select one of the air flow control devices from the listing of air flow control devices, and in response, display a plurality of critical operating parameters associated with the selected air flow control device, wherein the plurality of critical operating parameters are defined in a programmable tile associated with the selected air flow control device downloaded from the programmable zone controller via a wireless connection and stored on the mobile device.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
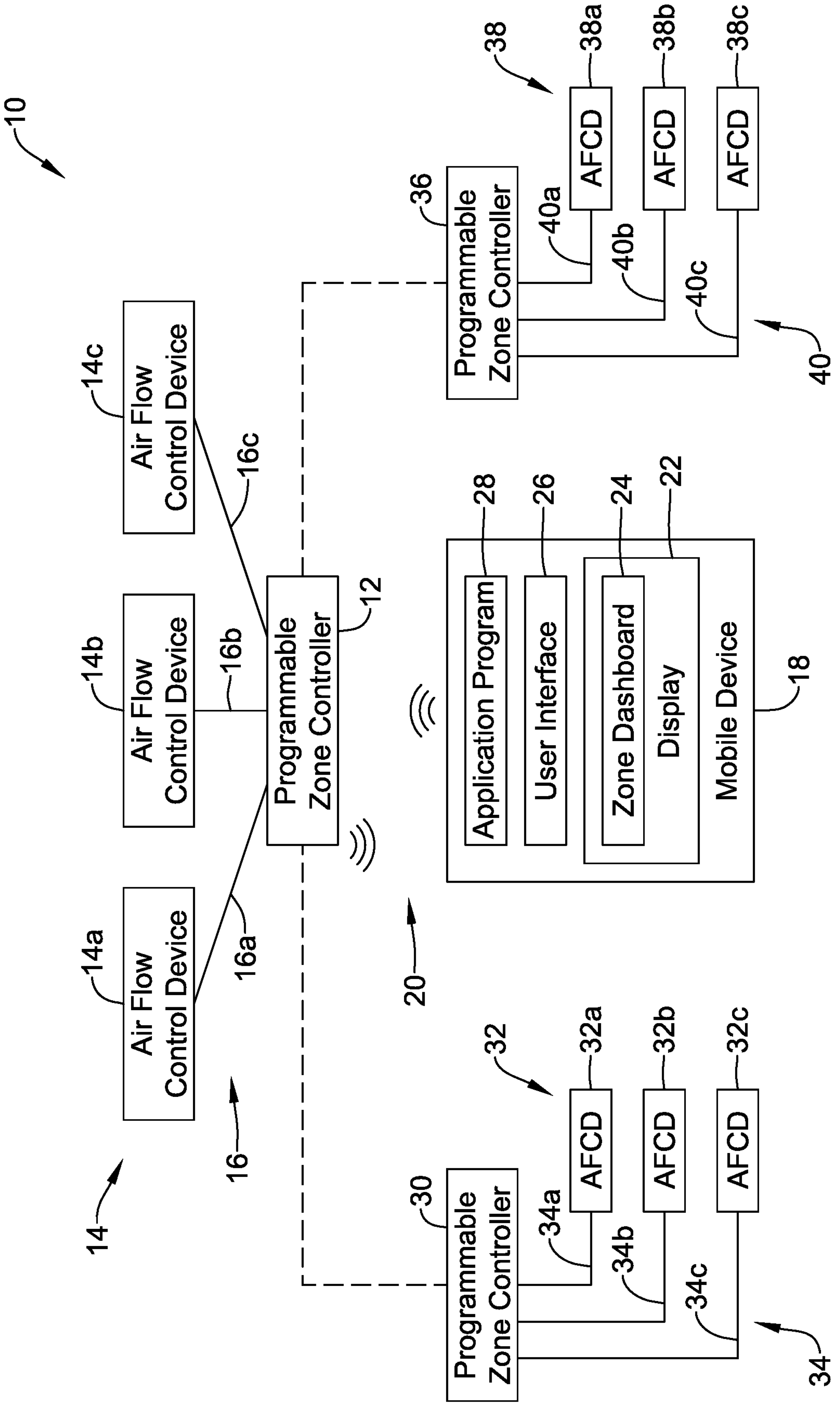
FIG. 1 is a schematic block diagram showing an illustrative system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram showing an illustrative system 10. The illustrative system 10 includes a programmable zone controller 12 and a number of air flow control devices 14 that are operatively coupled to the programmable zone controller 12 via a wired connection 16. The air flow control devices 14 are individually labeled as 14*a*, 14*b* and 14*c*, and the wired connections 16 are similarly labeled as 16*a*, 16*b* and 16*c*. While a total of three air flow control devices 14 are shown, this is merely illustrative, as the system 10 may include any number of air flow control devices 14 (and corresponding wired connections 16). In some instances, one or more of the air flow control devices 14 are fume hoods. In some cases, at least some of the air flow control devices 14 are Variable Air Volume (VAV) devices for controlling air flow to a space. These are just examples. The wired connection 16, including each of the wired connections 16*a*, 16*b* and 16*c*, may be implemented using a BACnet bus connection, but this is just an example.

A mobile device 18 is operatively coupled to the programmable zone controller 12 via a wireless connection 20. The wireless connection 20 may operate using any of a variety of different wireless communication protocols such as Bluetooth or WiFi, for example. The mobile device 18 includes a user interface 26, which may include a display 22 that can be used to display a zone dashboard 24. In some cases, the mobile device 18 may include a touchscreen display. In some cases, the display 22 and the user interface 26 may be separate components.

In some cases, the mobile device 18 is configured to execute an application program 28. The application program 28 is configured to communicate with the programmable zone controller 12 via the wireless connection 20. The application program 28 is configured to display the zone dashboard 24 on the display 22 of the mobile device 18, wherein the zone dashboard 24 includes a plurality of critical operating parameters associated with the programmable zone controller 12 that are retrieved from the programmable zone controller 12 via the wireless connection 20. In some cases, at least some of the critical operating parameters may be predetermined, but this is not required. In some cases, the application program 28 is configured to display a listing of the plurality of air flow control devices 14 that are operatively coupled to the programmable zone controller 12 and to allow a user of the mobile device 18 to select one of the air flow control devices 14 from the listing of air flow control devices 14, and in response, display a plurality of critical operating parameters associated with the selected air flow control device 14. In some cases, the plurality of critical operating parameters are defined in a number of programmable tiles associated with the selected air flow control device 14 downloaded from the programmable zone controller via the wireless connection 20 and stored on the mobile device 18, where each of the tiles includes a single critical operating parameter. In some cases, the application program 28 running on the mobile device 18 may dynamically fetch the tiles and render in each page per air flow control device 14. In some cases, the application program 28 may provide generic properties of the air flow control devices 14 for troubleshooting purposes. These properties may include one or more of device BACnet instance ID, serial number, Mac ID, firmware version, and others. The application program 28 may also provide a way to adjust valve curves and enabling refresh or replacement of valves and other devices.

In some cases, the system 10 may include an additional programmable zone controller 30 and a number of air flow control devices 32 that are operatively coupled to the corresponding programmable zone controller 30 via a wired connection 34. The air flow control devices 32 are individually labeled as 32*a*, 32*b* and 32*c*, and the wired connections 34 are similarly labeled as 34*a*, 34*b* and 34*c*. While a total of three air flow control devices 32 are shown, this is merely illustrative, as the system 10 may include any number of air flow control devices 32 (and corresponding wired connections 34). In some instances, at least some of the air flow control devices 32 are fume hoods. In some cases, at least some of the air flow control devices 32 are Variable Air Volume (VAV) devices for controlling air flow to a space. These are just examples. The wired connection 34, including each of the wired connections 34*a*, 34*b* and 34*c*, may be implemented using a BACnet bus connection, but this is just an example.

The system 10 may include an additional programmable zone controller 36 and a number of air flow control devices 38 that are operatively coupled to the programmable zone controller 36 via a wired connection 40. The air flow control devices 38 are individually labeled as 38*a*, 38*b* and 38*c*, and the wired connections 40 are similarly labeled as 40*a*, 40*b* and 40*c*. While a total of three air flow control devices 38 are shown, this is merely illustrative, as the system 10 may include any number of air flow control devices 38 (and corresponding wired connections 40). In some instances, the air flow control devices 38 are fume hoods. In some cases, at least some of the air flow control devices 38 are Variable Air Volume (VAV) devices for controlling air flow to a space. These are just examples. The wired connection 40, including each of the wired connections 40*a*, 40*b* and 40*c*, may be implemented using a BACnet bus connection, but this is just an example.

In some instances, the programmable zone controller 12 may be operatively coupled to one or more other programmable zone controllers such as the programmable zone controller 30 and/or the programmable zone controller 36. In some cases, the programmable zone controller 12 may be operatively coupled to one or more other programmable zone controllers via a BACnet or other bus connection. In some cases, the programmable zone controller 12 may be operatively coupled to any number of other programmable zone controllers. When the programmable zone controller 12 is operatively coupled to one or more other programmable zone controllers (such as the programmable zone controller 30 and/or the programmable zone controller 36), the application program 28 running on the mobile device 18 may be configured to display a listing of the one or more other programmable zone controllers that are operably coupled to the programmable zone controller 12 and to allow the user of the mobile device 18 to select one of the other programmable zone controllers (30, 36), and in response, display a plurality of critical operating parameters associated with the selected one of the other programmable zone controllers (30, 36). In some cases, at least some of the critical operating parameters may be predetermined, but this is not required. The application program 28 may be configured to display a listing of air flow control devices that are operatively coupled to the selected one of the other programmable zone controllers (30, 36) and may allow the user of the mobile device 18 to select one of the air flow control devices from the listing of air flow control devices that are operatively coupled to the selected one of the other programmable zone controllers (30, 36), and in response, display a plurality of critical operating parameters associated with the selected air flow control device that is operatively coupled to the selected one of the other programmable zone controllers (30, 36).

In some instances, the application program 28 is configured to reference one or more tiles for each of the plurality of air flow control devices 14, wherein each of the one or more tiles are locally stored on the mobile device 18 and define the plurality of critical operating parameters that are to be displayed in response to the user of the mobile device 18 selecting the corresponding one of the air flow control devices 14 from the listing of air flow control devices 14. In some cases, at least some of the critical operating parameters may be predetermined, but this is not required. In some cases, each tile may include a single critical parameter for a particular air flow control device 14. In some cases, the application program may be configured to allow the user to customize the one or more tiles for one or more of the plurality of air flow control devices 14 via the user interface 26 of the mobile device 18. In some cases, the one or more tiles for one or more of the plurality of air flow control devices 14 may be customized via a remote computer. In some cases, one or more tiles for each of one or more of the plurality of air flow control devices 14 may be downloaded from the programmable zone controller 12 to the mobile device 18 via the wireless connection 20 for subsequent reference by the application program 28.

In some cases, the application program 28 may be configured to repeatedly update the display of the plurality of critical operating parameters associated with the programmable zone controller 12 more frequently than once every 30 seconds. In some cases, the application program 28 may be configured to repeatedly update the display of the plurality of critical operating parameters associated with the programmable zone controller 12 every five seconds, every three second, every second, or any other desired update time. The application program 28 may be configured to repeatedly update the display of the plurality of critical operating parameters associated with the selected air flow control device 14 more frequently than once every 30 seconds, for example. In some cases, the application program 28 may be configured to repeatedly update the display of the plurality of critical operating parameters associated with the selected air flow control device 14 every five seconds, every three second, every second, or any other desired update time.

In some cases, the application program 28 may be configured to allow the user of the mobile device 18 to select one or more outputs of the programmable zone controller 12 and/or one or more outputs of one or more of the plurality of air flow control devices 14 for manual override, and to manually specify an override value for each of the one or more outputs selected for override. In some instances, the application program 28 may be configured to notify the programmable zone controller 12 via the wireless connection 20 of the one or more outputs of the programmable zone controller 12 and/or the one or more outputs of one or more of the plurality of air flow control devices 14 selected for override, and the override value for each of the one or more outputs selected for override, causing the programmable zone controller 12 and/or the one or more outputs of one or more of the plurality of air flow control devices 14 to drive each of the one or more outputs selected for override to the corresponding override value.

In some cases, the application program 28 may be configured to allow the user of the mobile device 18 to input an override duration, and to notify the programmable zone controller 12 via the wireless connection 20 of the override duration, causing the programmable zone controller 12 and/or the one or more outputs of one or more of the plurality of air flow control devices 14 to drive each of the one or more outputs selected for override to the corresponding override value for the override duration and then automatically relinquishing the override of the one or more outputs selected for override. The application program 28 may be configured to allow the user of the mobile device 18 to manually relinquish the override of one or more of the outputs that are currently being driven by the programmable zone controller 12 and/or the one or more outputs of one or more of the plurality of air flow control devices 14 to a corresponding override value.

When one of the air flow control devices 14 is a fume hood, the application program 28 may allow a user to set the fume hood into a hibernation mode, wherein in the hibernation mode, a fume hood ventilation setting of the fume hood is set to an energy savings hibernation setting (e.g. a low flow rate or off). In response to the user attempting to set the fume hood to the hibernation mode, the application program 28 may be configured to query the fume hood to see of the sash of the fume hood is fully closed, and if the sash is not fully closed, report to the user of the mobile device 18 that the sash is not fully closed. Once the sash is fully closed, the application program 28 may instruct the fume hood via the programmable zone controller to enter the hibernation mode.

In some cases, the application program 28 may be configured to visually display on the display 22 of the mobile device a current status of the programmable zone controller 12, wherein the current status of the programmable zone controller 12 is an aggregation of a status of the programmable zone controller 12 and a status of each of the plurality of air flow control devices 14 that are operably coupled to the programmable zone controller 12. The application program 28 may be configured to visually display on the display 22 of the mobile device 18 a listing of alarms associated with the programmable zone controller 12, wherein the listing of alarms associated with the programmable zone controller 12 is an aggregation of alarms reported by the programmable zone controller 12 and alarms reported by each of the plurality of air flow control devices 14 that are operably coupled to the programmable zone controller 12. In some cases, the application program 28 may be configured to allow the user of the mobile device 18 to select a particular alarm from the listing of alarms, and in response, display additional information for the selected alarm.

FIGS. 2A, 2B, 2C and 2D are flow diagrams that together show an illustrative method 44 for monitoring at least part of a space of a building, wherein the space of the building includes a plurality of devices for controlling the environment of the space (e.g. a laboratory) including a programmable zone controller (such as the programmable zone controller 12) operatively coupled to a plurality of air flow control devices of the space (such as the air flow control devices 14). The method 44 includes establishing a wireless connection between a mobile device (such as the mobile device 18) and the programmable zone controller, as indicated at block 46. The mobile device executes an application program (such as the application program 28) as indicated at block 48. The application program is configured to communicate with the programmable zone controller via the wireless connection, as indicated at block 48*a*. The application program is configured to display a zone dashboard on a display of the mobile device, wherein the zone dashboard includes a plurality of critical operating parameters associated with the programmable zone controller that are retrieved from the programmable zone controller via the wireless connection, as indicated at block 48*b*. The application program is configured to display a listing of air flow control devices that are operatively coupled to the programmable zone controller, as indicated at block 48*c*. The application program is configured to allow a user of the mobile device to select one of the air flow control devices from the listing of air flow control devices, and in response, display a plurality of critical operating parameters associated with the selected air flow control device, as indicated at block 48*d*.

In some instances, the method 44 includes the application program of the mobile device referencing a tile for each of the plurality of air flow control devices, wherein each of the tiles are locally stored on the mobile device and define the plurality of critical operating parameters that are to be displayed in response to the user of the mobile device selecting the corresponding one of the air flow control devices from the listing of air flow control devices, as indicated at block 50. In some cases, the tile for each of one or more of the plurality of air flow control devices may be downloaded from the programmable zone controller to the mobile device via the wireless connection for subsequent reference by the application program. In some cases, and continuing on FIG. 2B, the application program may be configured to allow the user to customize the tile for one or more of the plurality of air flow control devices via a user interface of the mobile device, as indicated at block 52. In some cases, examples of things that may be customized for a particular tile include the name of the tile, order, visibility, whether it is editable, minimum and maximum allowed values, BACnet point including setpoint mapped in control logic, alarm configuration, and others. The application program dynamically renders the tile. For example, if a non-editable property, the application program will make it read-only.

In some cases, the programmable zone controller may be operatively coupled to one or more other programmable zone controllers, as indicated at block 54. In such a case, the application program may be configured to display a listing of the one or more other programmable zone controllers that are operably coupled to the programmable zone controller, as indicated at block 54*a*. The application program may be configured to allow the user of the mobile device to select one of the other programmable zone controllers, and in response, display a plurality of critical operating parameters associated with the selected one of the other programmable zone controllers, as indicated at block 54*b*. The application program may be configured to display a listing of air flow control devices that are operatively coupled to the selected one of the other programmable zone controllers, as indicated at block 54*c*. The application program may be configured to allow the user of the mobile device to select one of the air flow control devices from the listing of air flow control devices that are operatively coupled to the selected one of the other programmable zone controllers, and in response, display a plurality of critical operating parameters associated with the selected air flow control device that is operatively coupled to the selected one of the other programmable zone controllers, as indicated at block 54*d*.

In some cases, the application program may be configured to repeatedly update the display of the plurality of critical operating parameters associated with the programmable zone controller more frequently than once every 30 seconds (e.g. every five second, every three seconds, or every 1 second), as indicated at block 56. Continued on FIG. 2C, the method 44 may further include the application program being configured to repeatedly update the display of the plurality of critical operating parameters associated with the selected air flow control device more frequently than once every 30 seconds (e.g. every five second, every three seconds, or every 1 second), as indicated at block 58. In some cases, the programmable zone controller may be operatively coupled to the plurality of air flow control devices via a wired connection. In some cases, the plurality of air flow control devices may include a fume hood and/or a VAV device.

In some cases, the method 44 may include the application program being configured to allow the user of the mobile device to select one or more outputs of the programmable zone controller and/or one or more outputs of one or more of the plurality of air flow control devices for manual override, and to manually specify an override value for each of the one or more outputs selected for override, as indicated at block 60. The application program may be configured to notify the programmable zone controller via the wireless connection of the one or more outputs of the programmable zone controller and/or the one or more outputs of one or more of the plurality of air flow control devices selected for override, and the override value for each of the one or more outputs selected for override, causing the programmable zone controller and/or the one or more outputs of one or more of the plurality of air flow control devices to drive each of the one or more outputs selected for override to the corresponding override value, as indicated at block 62.

The method 44 may include the application program being configured to allow the user of the mobile device to input an override duration, and to notify the programmable zone controller via the wireless connection of the override duration, causing the programmable zone controller and/or the one or more outputs of one or more of the plurality of air flow control devices to drive each of the one or more outputs selected for override to the corresponding override value for the override duration and then automatically relinquishing the override of the one or more outputs selected for override, as indicated at block 64. In some cases, the application program may be configured to allow the user of the mobile device to manually relinquish the override of one or more of the outputs that are currently being driven by the programmable zone controller and/or the one or more outputs of one or more of the plurality of air flow control devices to a corresponding override value, as indicated at block 66.

In some instances, one of the air flow control devices may be is a fume hood, and the application program may allow a user to set the fume hood into a hibernation mode, wherein in the hibernation mode a fume hood ventilation setting of the fume hood is set to an energy savings hibernation setting (e.g. a low flow rate or off). In some cases, the application program may be configured to query the fume hood to check whether a sash of the fume hood is fully closed before entering the hibernation mode, and if the sash is not fully closed, report to the user of the mobile device that the sash is not fully closed. Once the sash is fully closed, the application program 28 may instruct the fume hood via the programmable zone controller to enter the hibernation mode, as indicated at block 68.

Figure 2A:
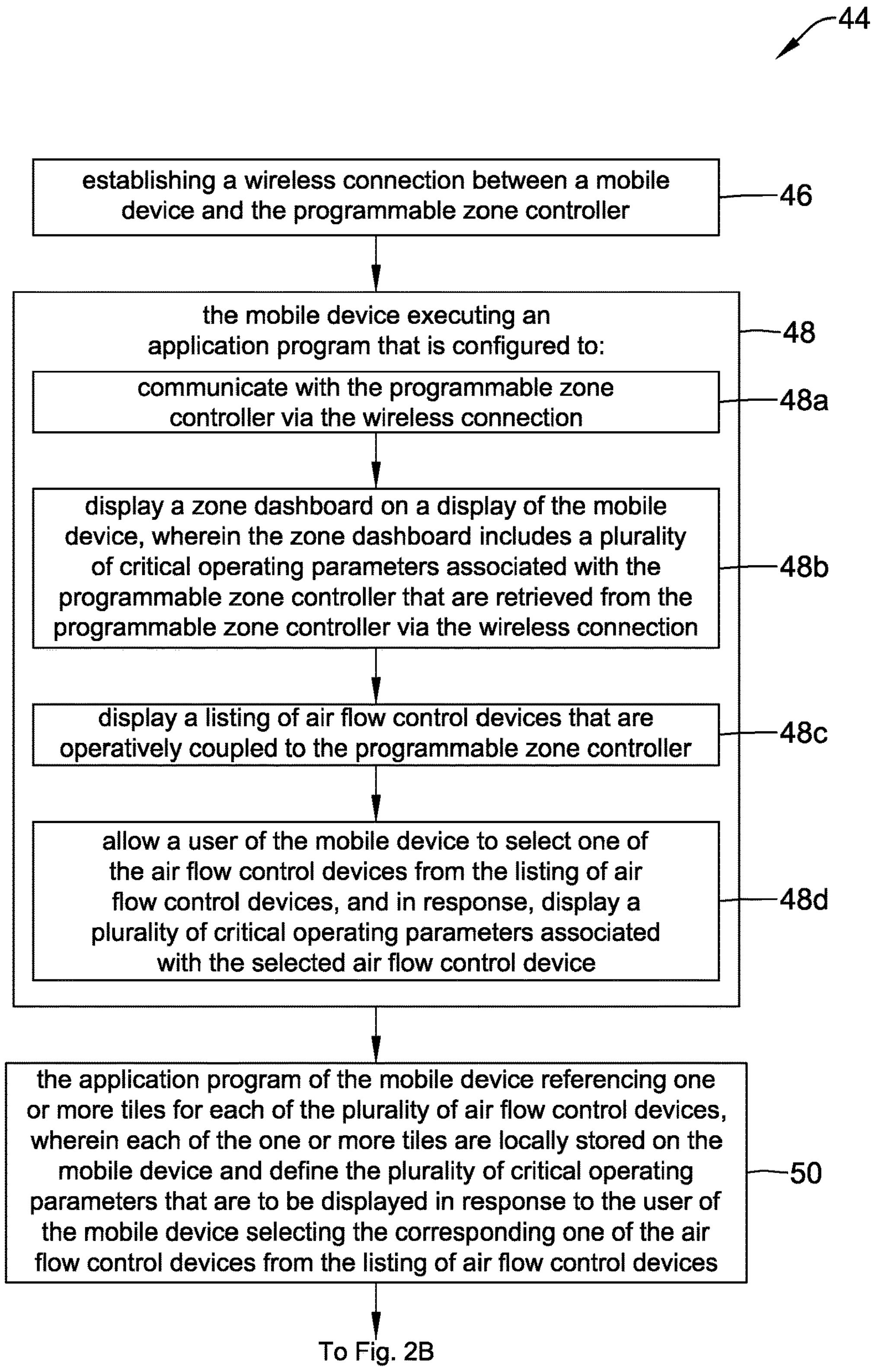
FIGS. 2A, 2B, 2C and 2D are flow diagrams that together show an illustrative method for monitoring at least part of a space of a building.
Figure 2B:
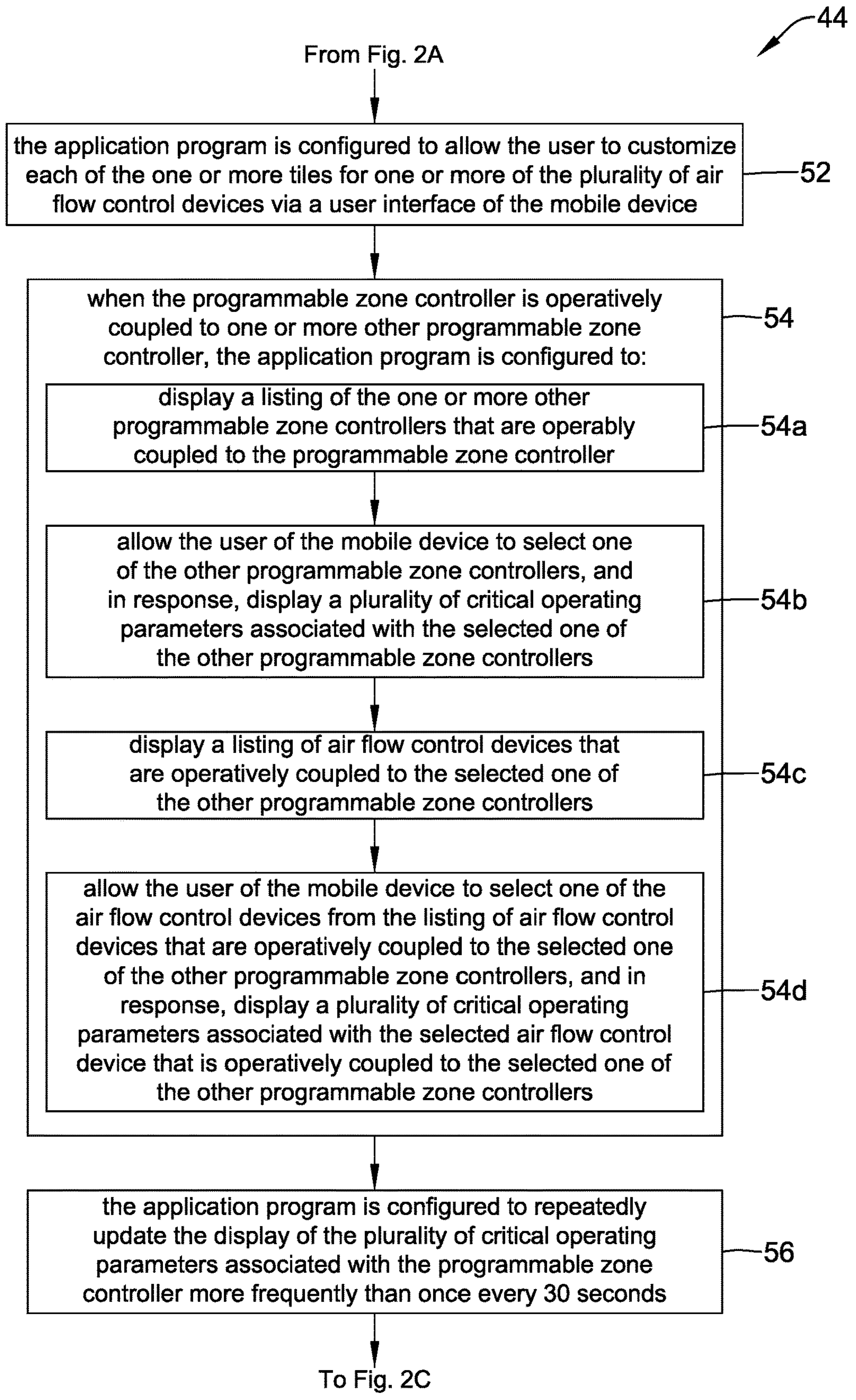
Figure 2C:
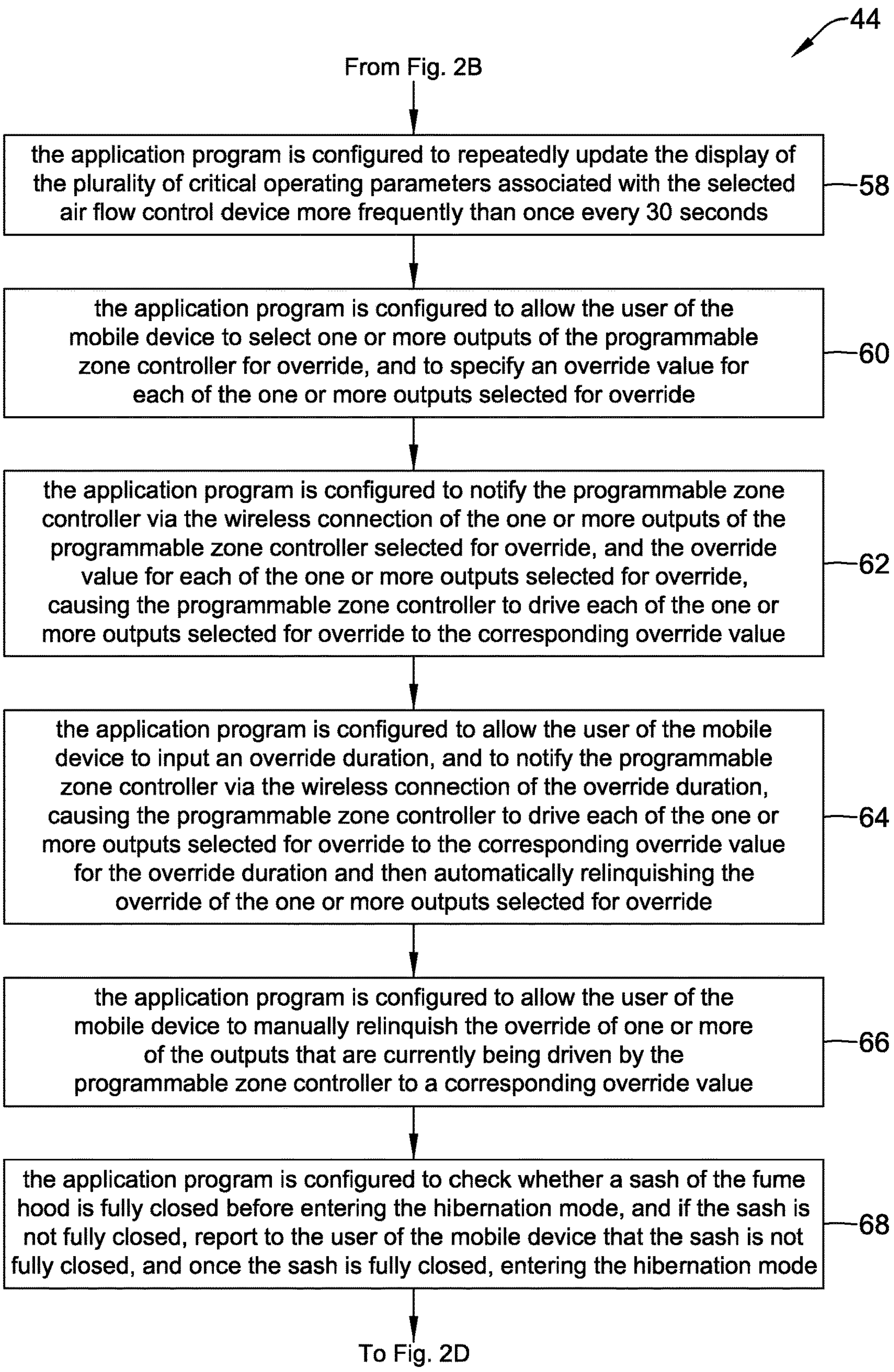
Figure 2D:
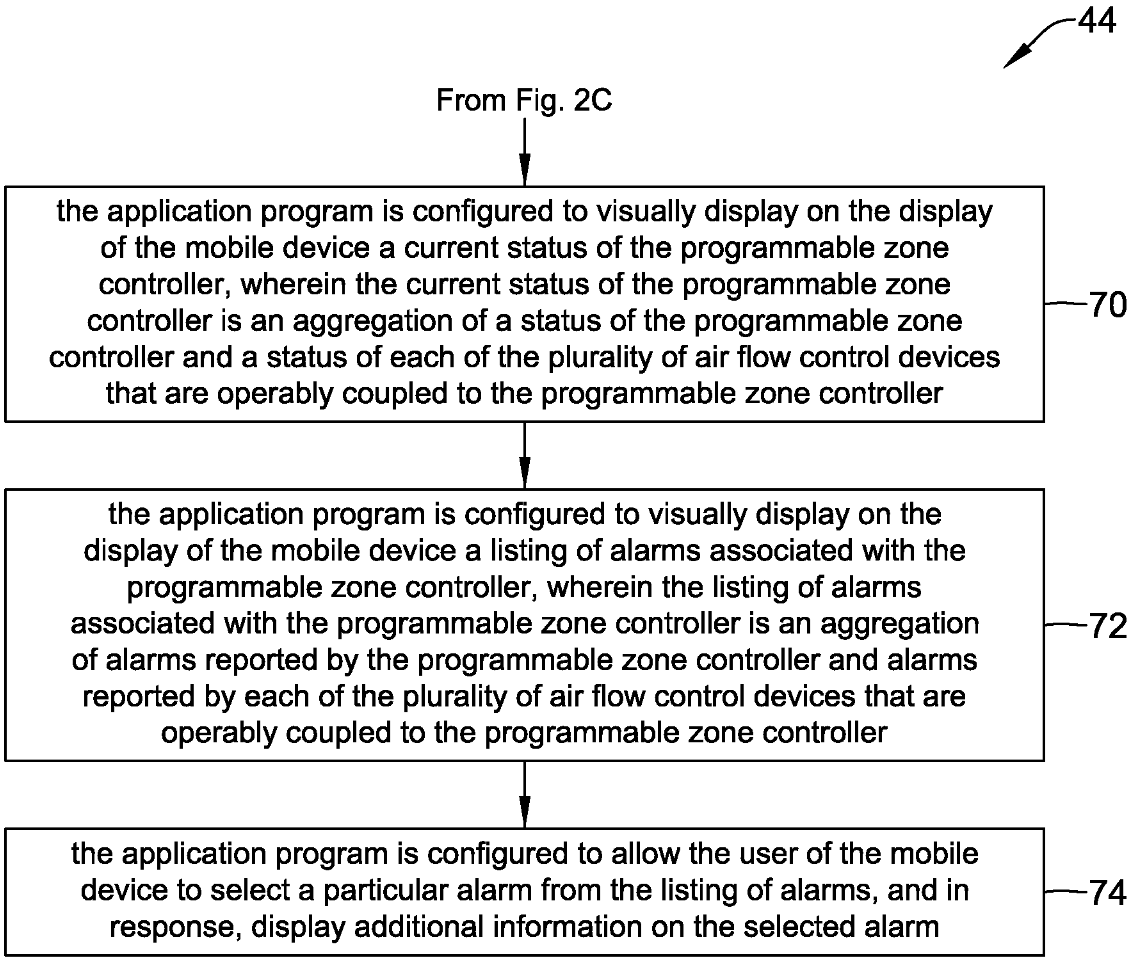

In some cases, and continuing on FIG. 2D, the method 44 may include the application program being configured to visually display on the display of the mobile device a current status of the programmable zone controller, wherein the current status of the programmable zone controller is an aggregation of a status of the programmable zone controller and a status of each of the plurality of air flow control devices that are operably coupled to the programmable zone controller, as indicated at block 70. In some cases, the method 44 may include the application program being configured to visually display on the display of the mobile device a listing of alarms associated with the programmable zone controller, wherein the listing of alarms associated with the programmable zone controller is an aggregation of alarms reported by the programmable zone controller and alarms reported by each of the plurality of air flow control devices that are operably coupled to the programmable zone controller, as indicated at block 72. In some cases, the listing of alarms may include the alarms associated with the programmable zone controller but not an aggregation of the alarms reported by each of the plurality of air flow control devices that are operably coupled to the programmable zone controller. In some cases, the application program may display on the display of the mobile device a listing of alarms reported by one or more of the plurality of air flow control devices that are operably coupled to the programmable zone controller in a separate listing of alarms. In any event, the application program may be configured to allow the user of the mobile device to select a particular alarm from the listing of alarms, and in response, display additional information for the selected alarm, as indicated at block 74. The application program running on the mobile device will allow the user to acknowledge alarms. In some cases, the application program will also provide the user with troubleshooting tips on what the alarm is about, why it occurred and how to fix the problem so that it does not reoccur. This can include using AI (artificial intelligence) to provide recommended settings to avoid the problem in the future, and automatically applying those settings based on the user's confirmation.

Figure 3:
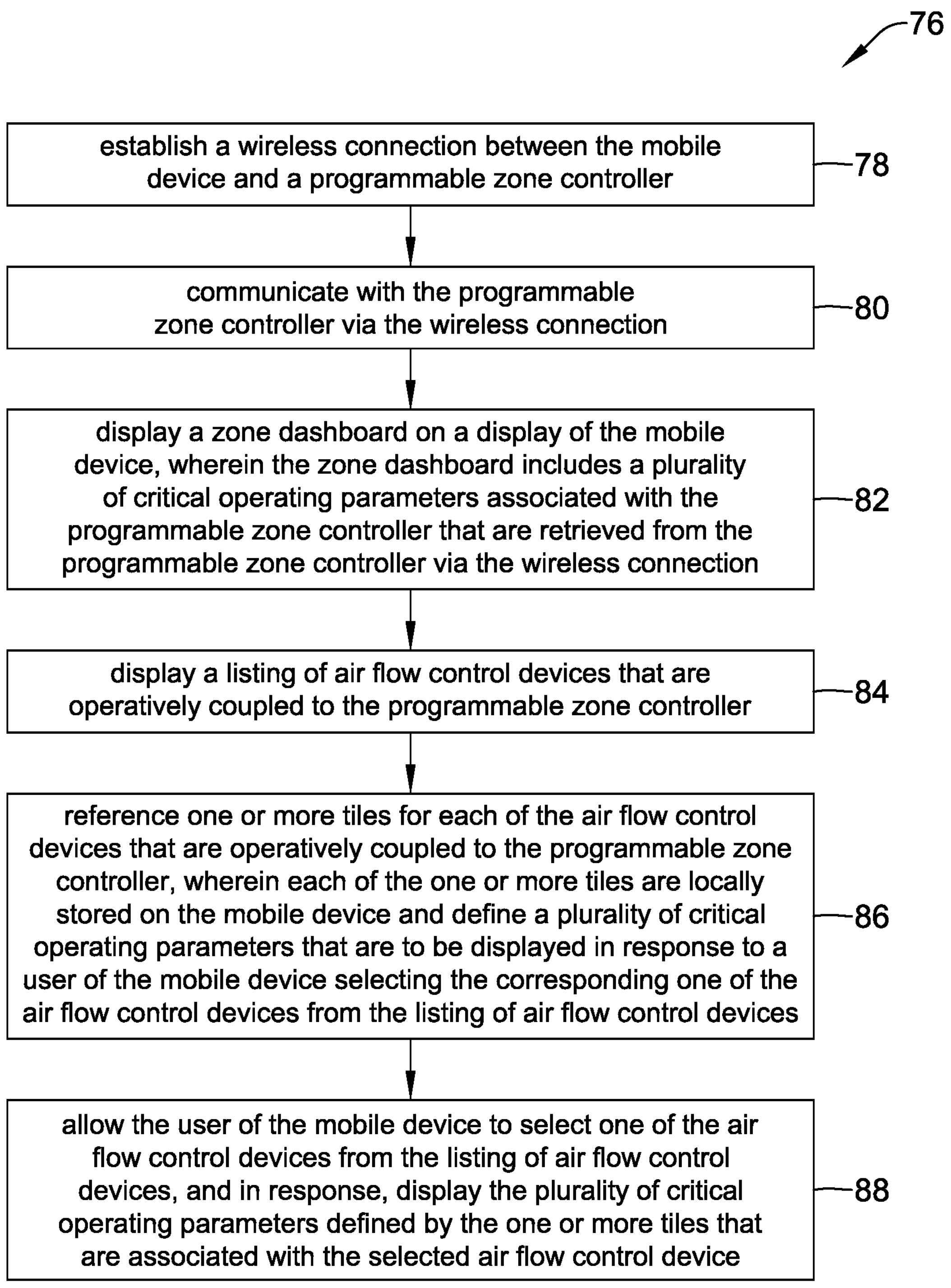
FIG. 3 is a flow diagram showing an illustrative series of steps that may be carried out by one or more processors of a mobile device when the one or more processors are executing executable instructions stored on the mobile device.

FIG. 3 is a flow diagram showing an illustrative series of steps 76 that may be carried out by one or more processors of a mobile device (such as the mobile device 18) when the one or more processors are executing executable instructions stored on the mobile device. In this example, the one or more processors are caused to establish a wireless connection between the mobile device and a programmable zone controller, as indicated at block 78. The one or more processors are caused to communicate with the programmable zone controller via the wireless connection, as indicated at block 80. The one or more processors are caused to display a zone dashboard on a display of the mobile device, wherein the zone dashboard includes a plurality of critical operating parameters associated with the programmable zone controller that are retrieved from the programmable zone controller via the wireless connection, as indicated at block 82. The one or more processors are caused to display a listing of air flow control devices that are operatively coupled to the programmable zone controller, as indicated at block 84. The one or more processors are caused to reference a tile for each of the air flow control devices that are operatively coupled to the programmable zone controller, wherein each of the tiles are locally stored on the mobile device and define a plurality of critical operating parameters that are to be displayed in response to a user of the mobile device selecting the corresponding one of the air flow control devices from the listing of air flow control devices, as indicated at block 86. The one or more processors are caused to allow the user of the mobile device to select one of the air flow control devices from the listing of air flow control devices, and in response, display the plurality of critical operating parameters defined by the tile that is associated with the selected air flow control device, as indicated at block 88.

Figure 4:
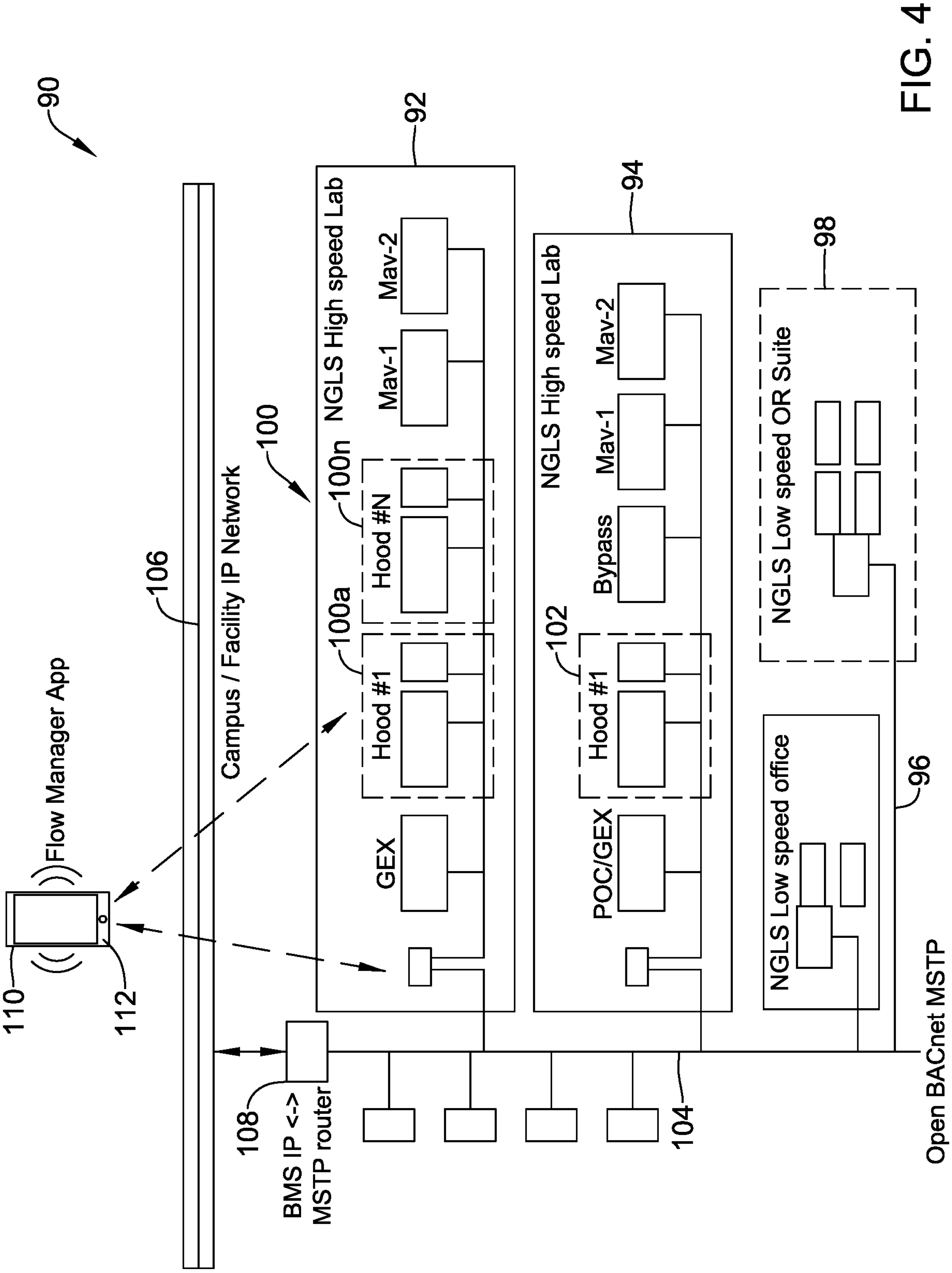
FIG. 4 is a schematic block diagram showing an illustrative system architecture.

FIG. 4 is a schematic block diagram showing an illustrative system architecture 90 may be considered as deploying the system 10 shown in FIG. 1. The system architecture 90 includes a first laboratory 92 (e.g. first zone), a second laboratory 94 (e.g. second zone), an office 96 (e.g. third zone) and a suite 98 (e.g. fourth zone). The first laboratory 92 (e.g. first zone) and the second laboratory 94 (e.g. second zone) in this example may be considered high speed spaces because some or all of the air flow control devices in the spaces include high speed valves that can be opened or closed in a relatively short period of time (e.g. less than 5 seconds). This may be important, particularly for laboratory settings, where there may a chemical, toxin or other release that could be dangerous if not ventilated quickly. The use of the mobile device of the present disclosure may allow on-site personnel to monitor in real or near real time the status and/or alarms of the devices in such spaces, which may help improve the safety of the spaces.

The first laboratory 92 includes several fume hoods 100, individually labeled as a fume hood 100*a* and a fume hood 100*n*. The first laboratory 92 may include any number of fume hoods 100, even though only two are shown. The second laboratory 94 is shown as including a fume hood 102. The first laboratory 92, the second laboratory 94, the office 96 and the suite 98 each include a programmable zone controller that is wired to each of the corresponding air flow control devices. Each of the programmable zone controllers is operably coupled to a BACnet network 104. The BACnet network 104 is itself operably coupled to an IP network 106 via a router 108. A flow manager application 110, running on a mobile device 112, is able to wirelessly communicate with a programmable zone controller that is within wireless range, and to the air flow control devices associated with the programmable zone controller. Once the flow manager application 110 is able to establish communication with one of the programmable zone controllers, the flow manager application 110 can access other programmable zone controller that are out of wireless range via the programmable zone controller to which is has established communication.

Figure 5:
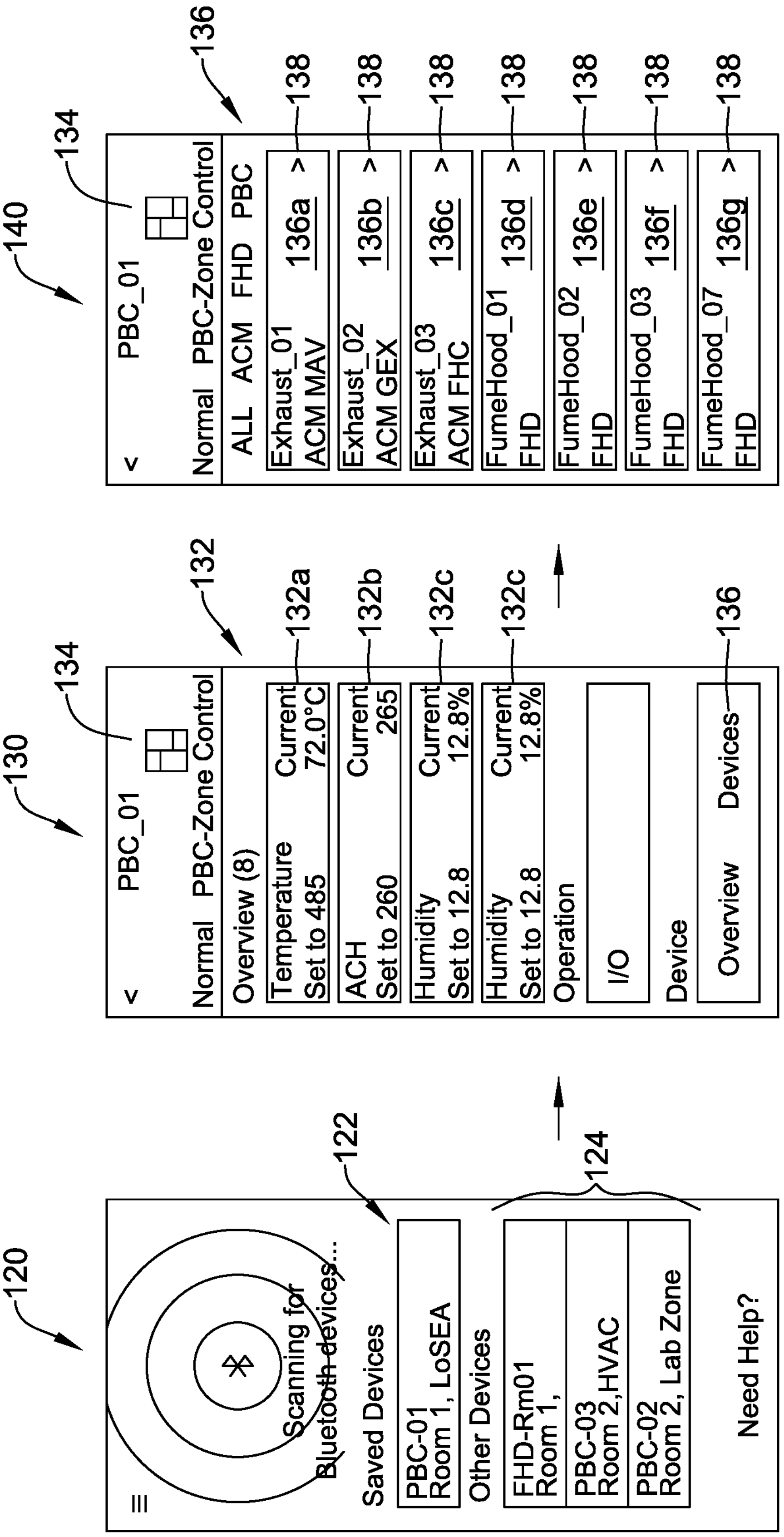
FIG. 5 shows a series of screen shots from an application program running on a mobile device.

FIG. 5 shows a series of screen shots from an application program running on a mobile device. On the left, a screen 120 may be displayed when the application program is searching for Bluetooth devices (e.g. searching for programmable zone controllers). The screen 120 includes a listing 122 (only one is shown) of previously detected and saved devices, and a listing 124 of detected Bluetooth devices. Selecting the PBC_01 device (e.g. programmable zone controller_01) from the listing 122 causes the application program to display a screen 130, as shown in the center of FIG. 5. The screen 130 includes a lab dashboard 132 that includes several parameters, including a temperature parameter 132*a*, an air changes per hour parameter 132*b* and several humidity parameters 132*c*. These parameters may be defined by a tile stored on the mobile device that corresponds to the PBC_01 device. The screen 130 includes a header bar 134 that identifies the information being displayed. In some cases, the header bar 134 may be a particular color in order to quickly indicate whether there are any problems/alarms associated with the displayed device, e.g. PBC_01 device (e.g. programmable zone controller_01). If no problems current exist, the header bar 134 may be green, for example. If there is a substantial problem, the header bar 134 may be red, for example. A yellow color for the header bar 134 may indicate an issue that is not yet critical.

The illustrative screen 130 includes a DEVICES button 136 that, when selected, may cause the application program to display a screen 140, as shown on the right hand side of FIG. 5 including a listing of relevant devices (e.g. air flow devices that are operatively coupled to the PBC_01 device (e.g. programmable zone controller_01). In the example shown, the listing includes an Exhaust_01 device 136*a*, an Exhaust_02 device 136*b*, an Exhaust_03 device 136*c*, a FumeHood_01 device 136*d*, a FumeHood_02 device 136*e*, a FumeHood_03 device 136*f* and a PCB_Zone_07 device 136*g*, each of which includes a right arrow that may be selected to cause the application program to display additional information regarding that particular device.

Figure 6:
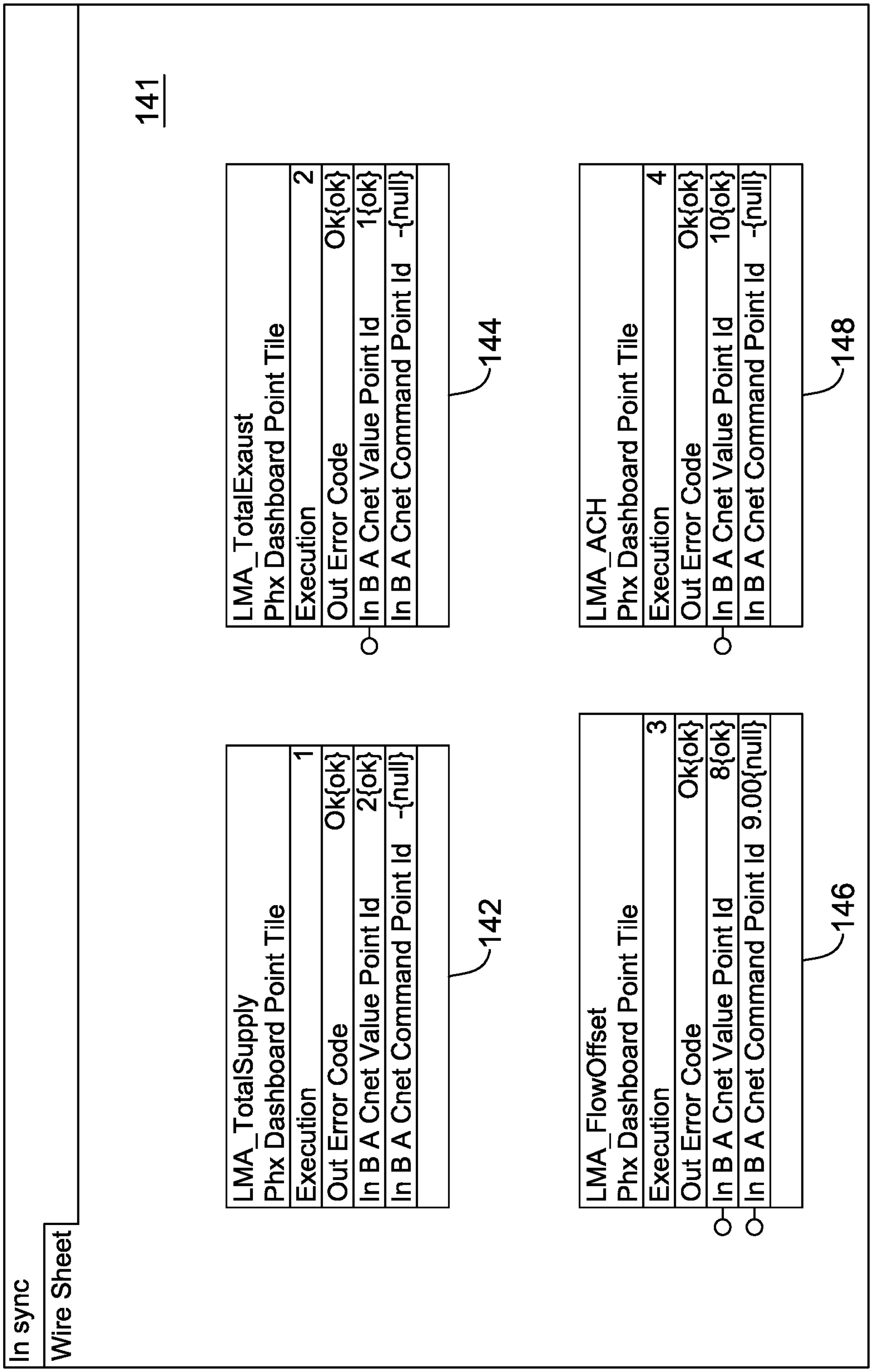
FIG. 6 is a schematic view of an illustrative wire screen including several tile function blocks.
Figure 7:
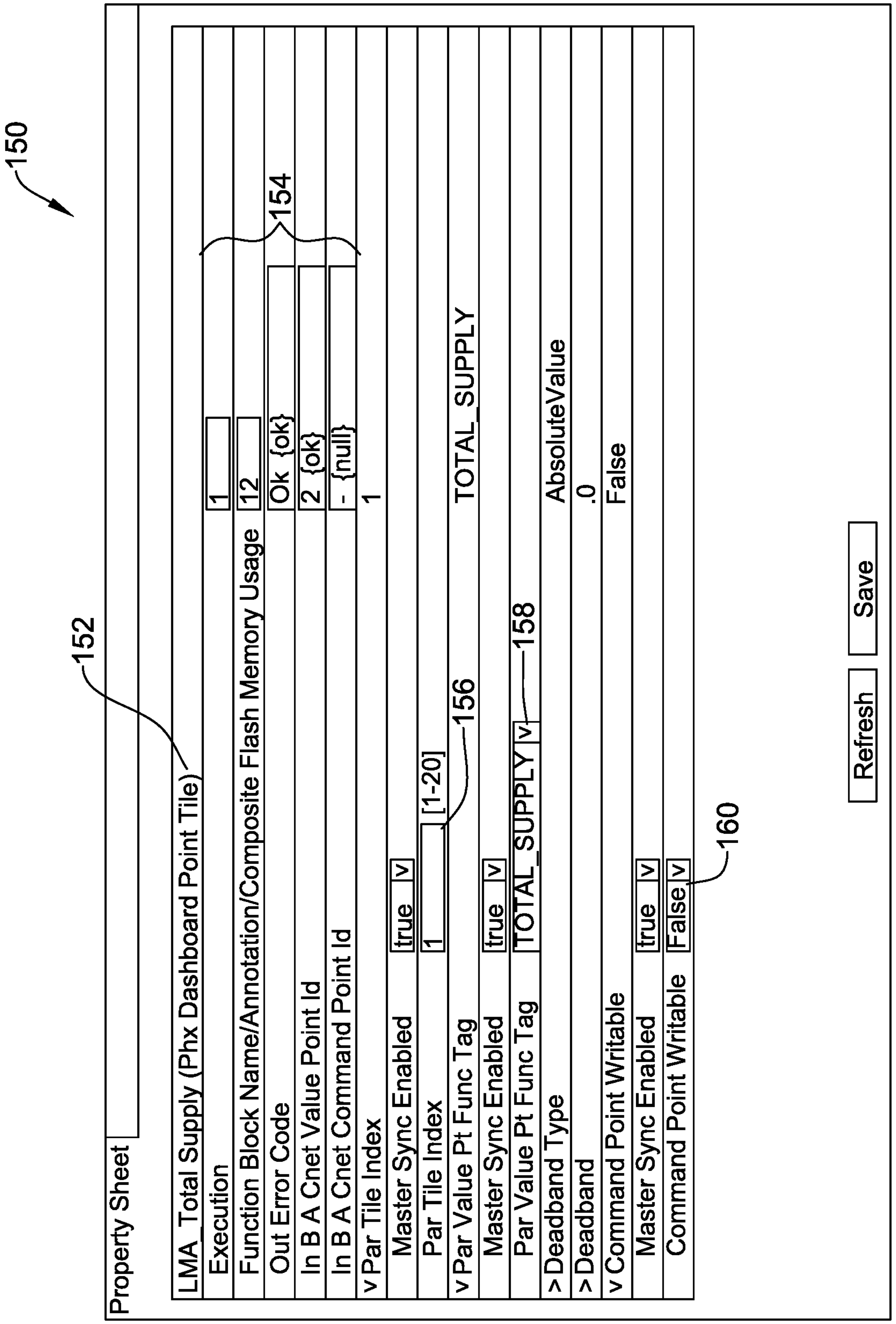
FIG. 7 is a schematic view of a screen displayed in response to a user selecting one of the tile function blocks of FIG. 6.

FIG. 6 is a schematic illustration of creating or editing tiles for each device. FIG. 6 shows a function block wire sheet 141, showing several function blocks. In the example shown, the function blocks are Niagara™ function blocks defined using the Niagara™ system available from Tridium Inc. Each of the function blocks in FIG. 6 may be considered as defining a tile for a particular device. From left to right, the function blocks include a TotalSupply function block 142, an LMA_TotalExhaust function block 144, an LMA-_Flow_Offset function block 146 and an LMA_ACH function block 148. Each function block 142, 144, 146 and 148 may be used to define a tile. Clicking on one of the function blocks 142, 144, 146 and 148 may display additional information for that particular function block 142, 144, 146 and 148. As an example, clicking on the TotalSupply function block 142 will display a screen 150, as shown in FIG. 7. The screen 150 includes an indicator 152 showing that the additional information displayed does in fact pertain to the TotalSupply function block 142. Several points of interest defined in the tile include a connected BACnet point 154, a tile index or order 156, a display text and associated function type 158 and point writable status 160. These are just examples.

Figure 8:
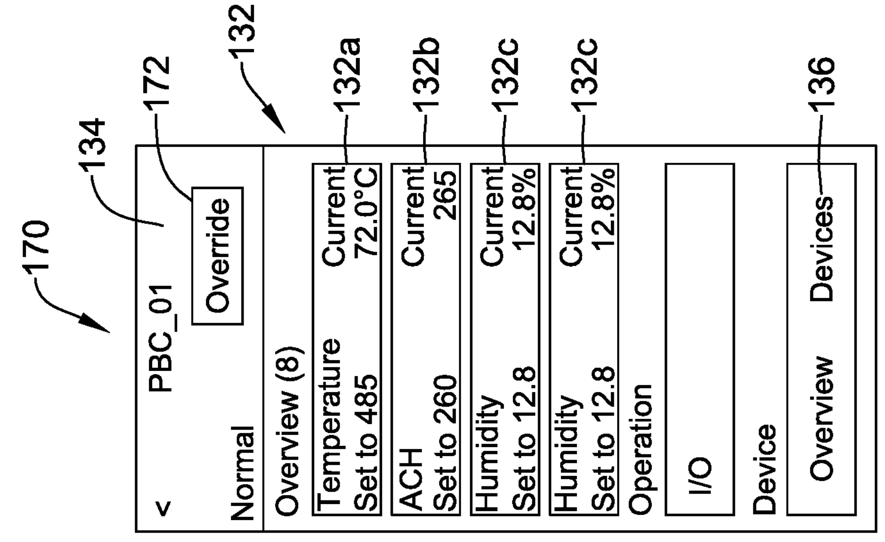
FIGS. 8, 9 and 10 are schematic views of screens displayed by the application program pertaining to an override mode.
Figure 9:
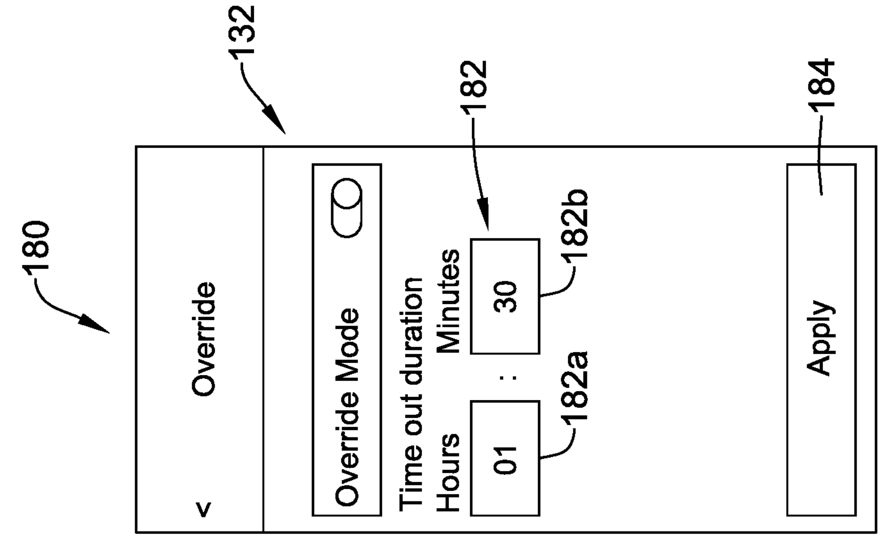
Figure 10:
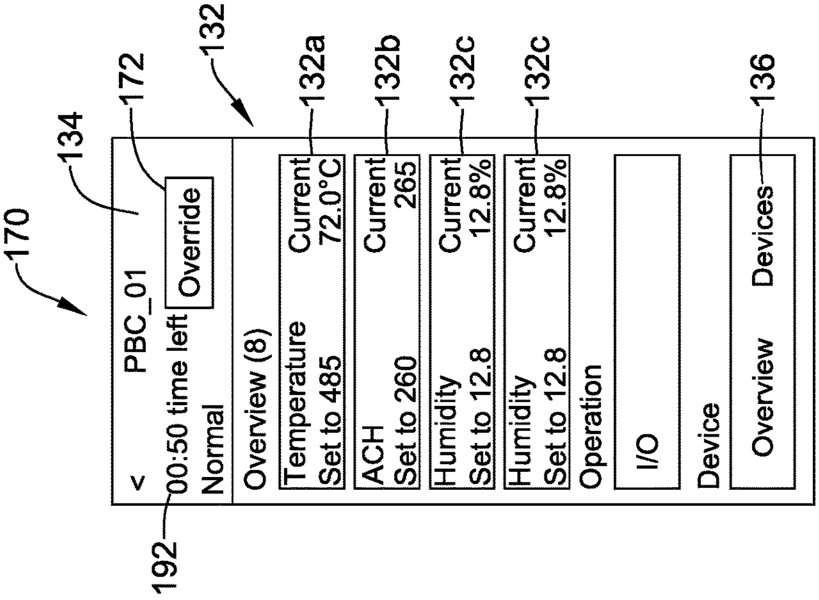

FIG. 8 shows a screen 170 that is similar the screen 130 shown in FIG. 5, but includes an indication 172 that PBC_1 is currently in an override mode. FIG. 9 shows a screen 180 that includes a timer 182 that may be used to adjust the duration of an override. As shown, the timer 182 includes an hours timer 182*a* and a minutes timer 182*b*. An APPLY button 184, when selected, instructs the application program to implement the new override duration. FIG. 9 shows a screen 190 that is similar to the screen 170 shown in FIG. 8, but includes an indicator 192 showing the remaining override duration before the override is relinquished.

Figure 11:
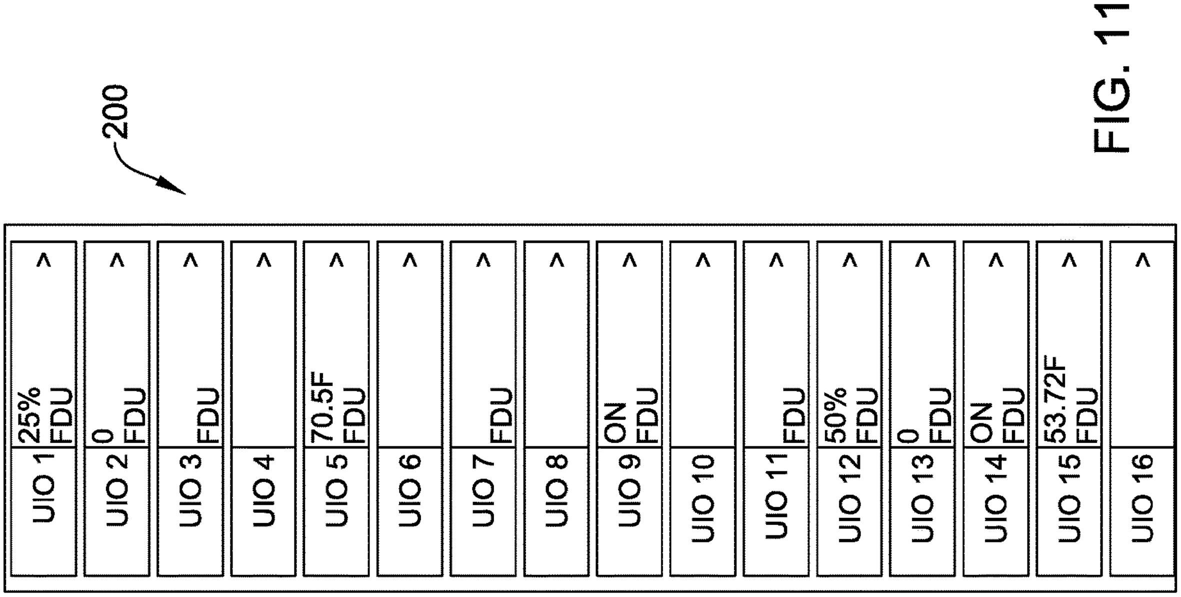
FIGS. 11, 12 and 13 are schematic views of screens that may be displayed by the application program that are related to valve position override.
Figure 12:
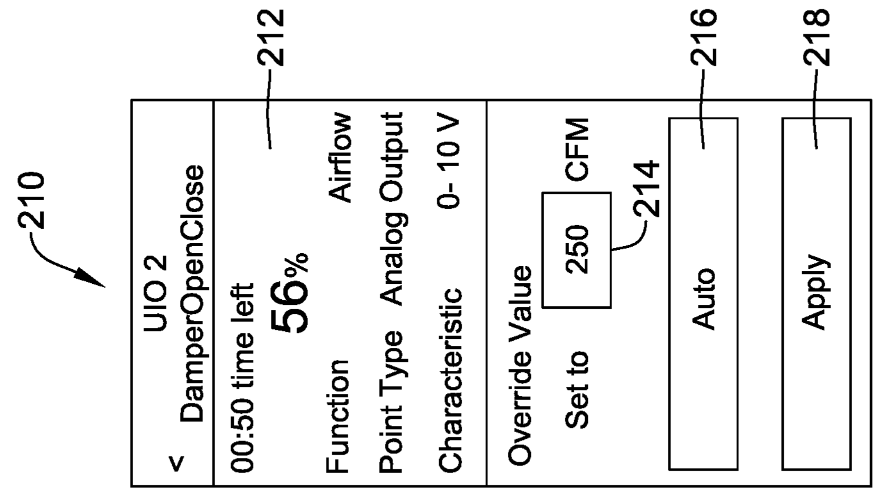
Figure 13:
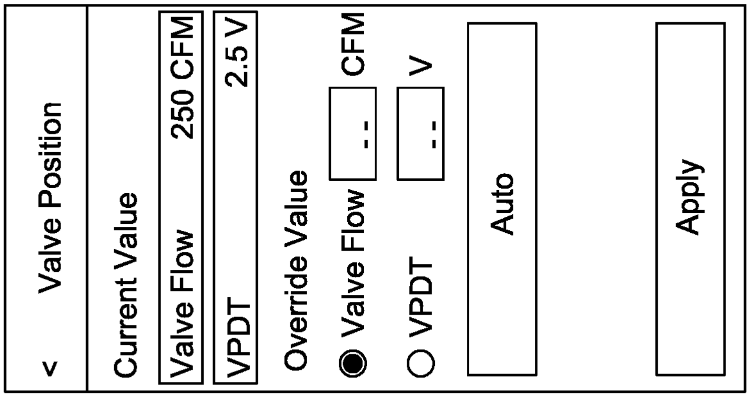

FIGS. 11, 12 and 13 are schematic views of screens that may be displayed by the application program that are related to valve position override. FIG. 11 shows a screen 200 that includes values for certain terminals. FIG. 12 shows a screen 210 that provides options for the UIO 2 terminal. A block 212 shows current damper position, function, point type and characteristic. An override value box 214 allows a user to set an override value for the air flow (dictated by the UIO 2 terminal). An APPLY button 218 instructs the application program to implement the override value. FIG. 13 shows the screen with the override air flow value of 250 CFM applied.

An AUTO button 216 may be used to end manual override control, and causes the application program to revert back to its auto setpoint(s).

Figure 14A:
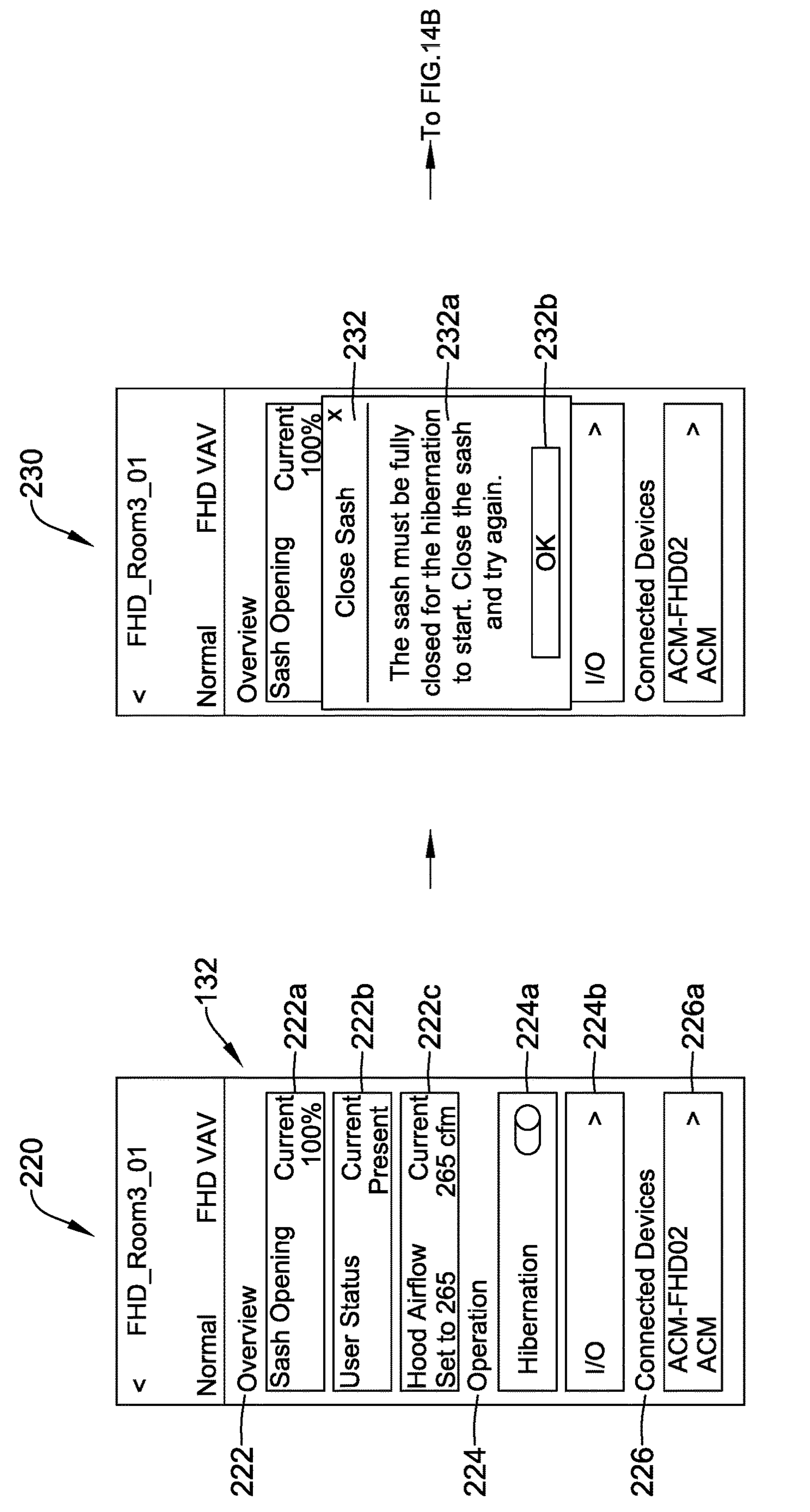
FIGS. 14A and 14B together provide illustrative screen shots of several screens, in order, that may be displayed by the application program.
Figure 14B:
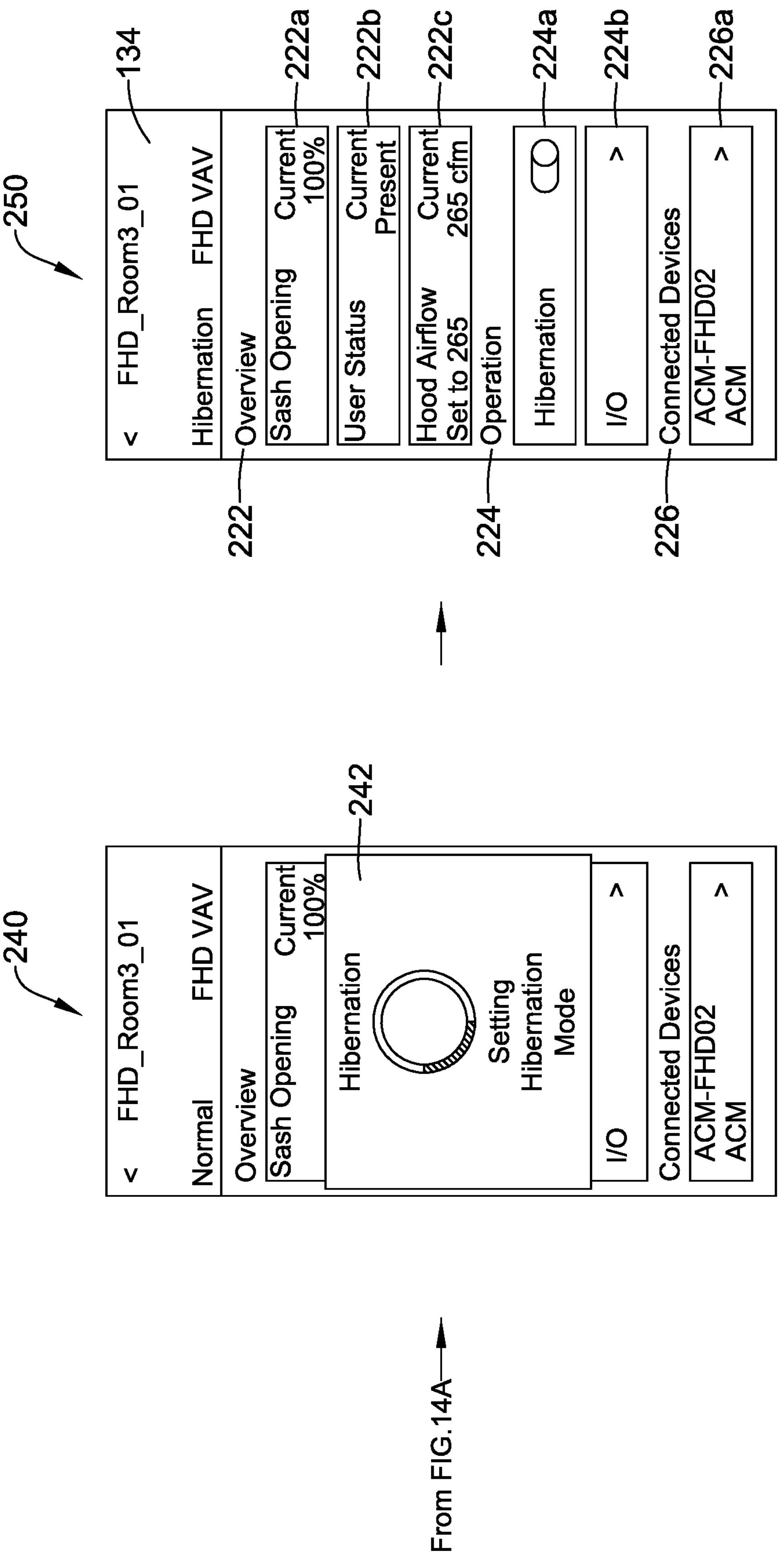

FIGS. 14A and 14B together provide schematic views of several screens, in order, that may be displayed by the application program of the mobile device. A first screen 220 includes information regarding a fume hood FHD-_ROOM3_01. An Overview section 222 includes a sash opening parameter 222*a*, a user status parameter 222*b*, and a hood airflow parameter 222*c*. An operation section 224 includes a Hibernation toggle 224*a* and an I/O display 224*b*. A Connected Devices section 226 includes an ACM-FHD02 device display 226*a*. Toggling the Hibernation toggle 224*a* will cause the application program to move towards putting the particular fume hood device into hibernation. If the sash is not closed, a screen 230 will be displayed. The screen 230 is the same as the screen 220, but includes a superimposed block 232 that includes instructions 232*a* for the user to close the sash, and an OK button 232*b* that the user can select once they have closed the sash in order to notify the application program that the sash has been closed. After the OK button 232*b* has been selected, a screen 240 is displayed. The screen 240 is the same as the screen 220, but includes a superimposed block 242 that informs the user that the hibernation mode is being set. Once in hibernation mode, a screen 250 may be displayed that is the same as the screen 220, other than the header bar 134 being displayed in a different color (such as blue, for example) to indicate hibernation, and the Hibernation toggle 224*a* being switched to on.

Figure 15:
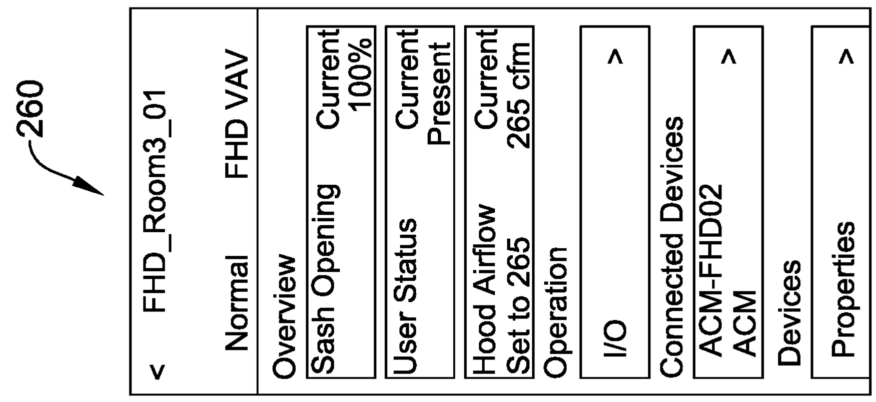
FIGS. 15, 16, 17 and 18 provide illustrative screen shots of several screens, showing different function types.
Figure 16:
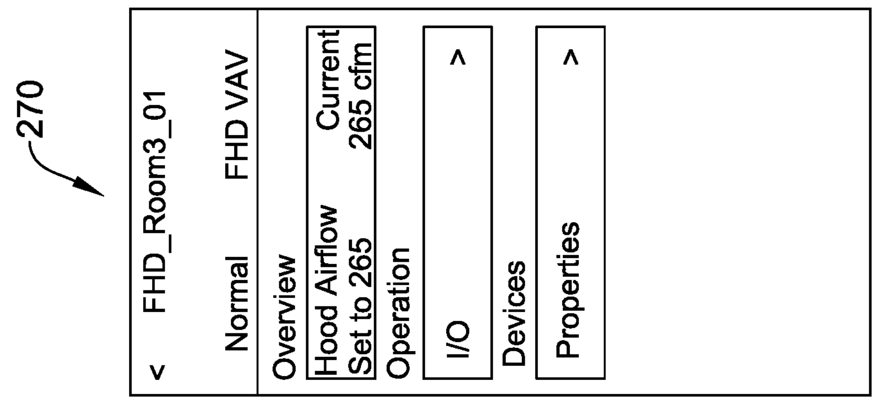
Figure 18:
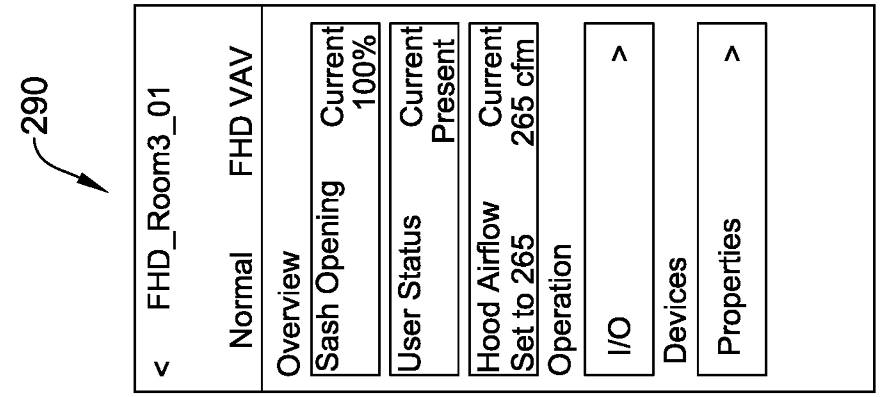
Figure 17:
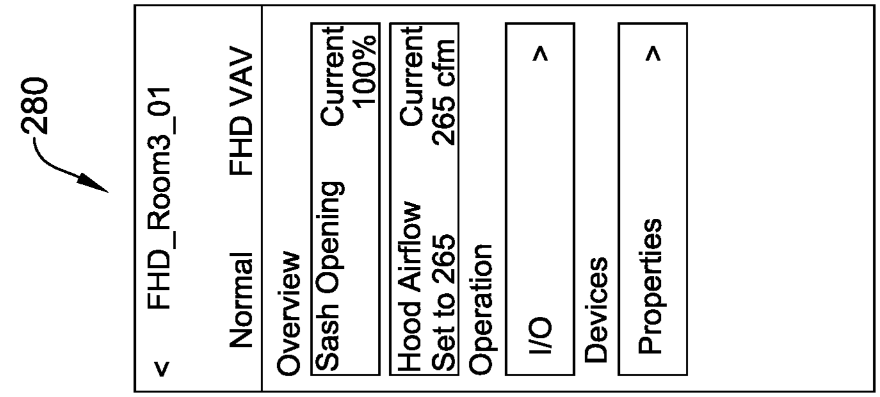

FIGS. 15, 16, 17 and 18 provide screen shots of several screens, showing different function types of fume hoods that may be displayed on the mobile device. FIG. 15 shows a screen 260 including information that may be displayed for a VAV (Variable Air Volume for variable face velocity control) function type of a fume hood. FIG. 16 shows a screen 270 including information that may be displayed for a CVV (Constant Volume Ventilation for constant face velocity control) function type of a fume hood. FIG. 17 shows a screen 280 including information that may be displayed for a 2 state (ON/OFF) function type of a fume hood. FIG. 18 shows a screen 290 including information that may be displayed for a Drive function type of a fume hood. These are just examples. The parameters that are displayed on each of these screens 260, 270, 280 and 290 may be defined by a corresponding tile.

Figure 19A:
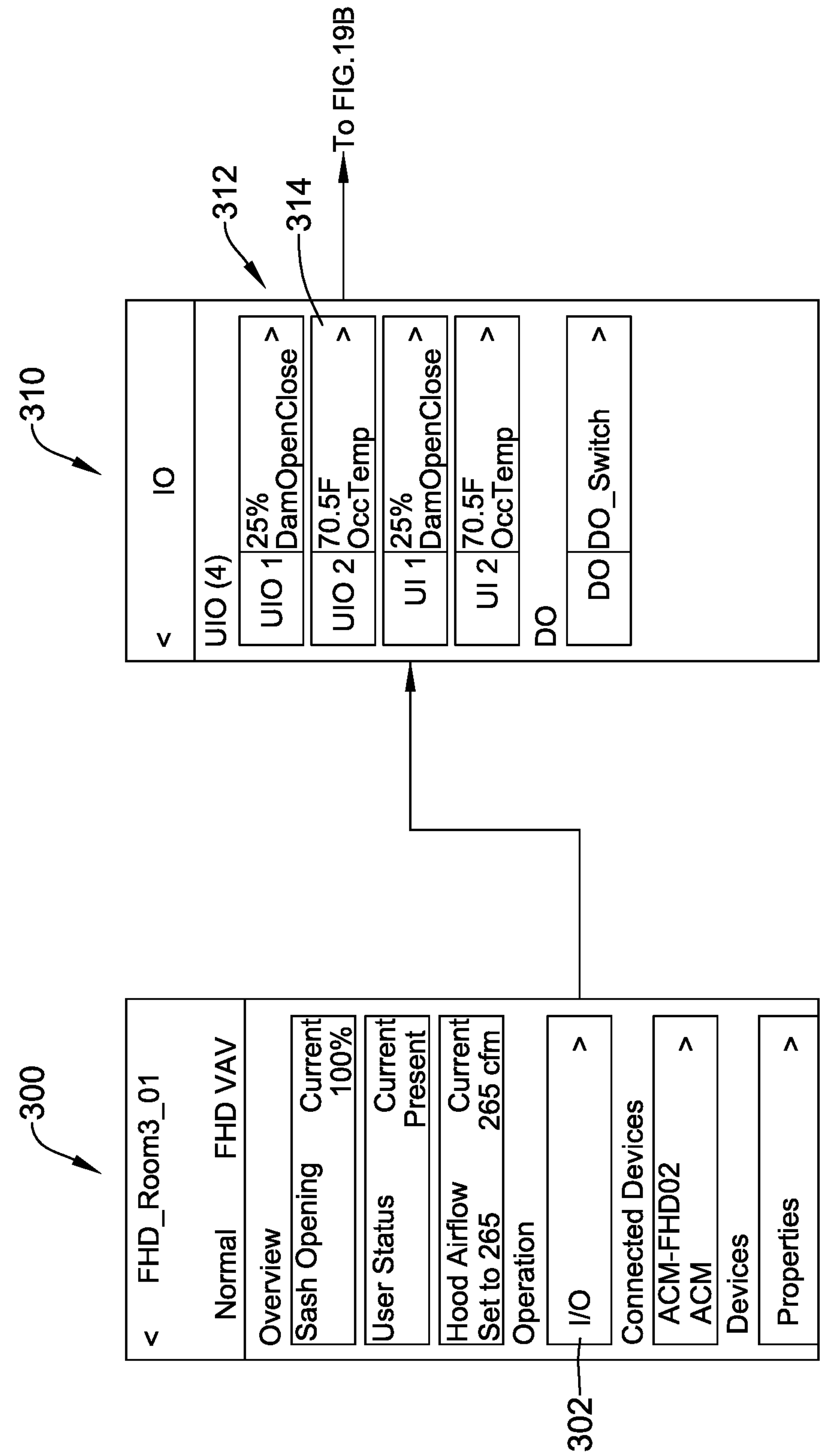
FIGS. 19A and 19B together provide several screens that may be displayed related to Fume Hood Device (FHD) Universal Input/Output (UIO) override.
Figure 19B:
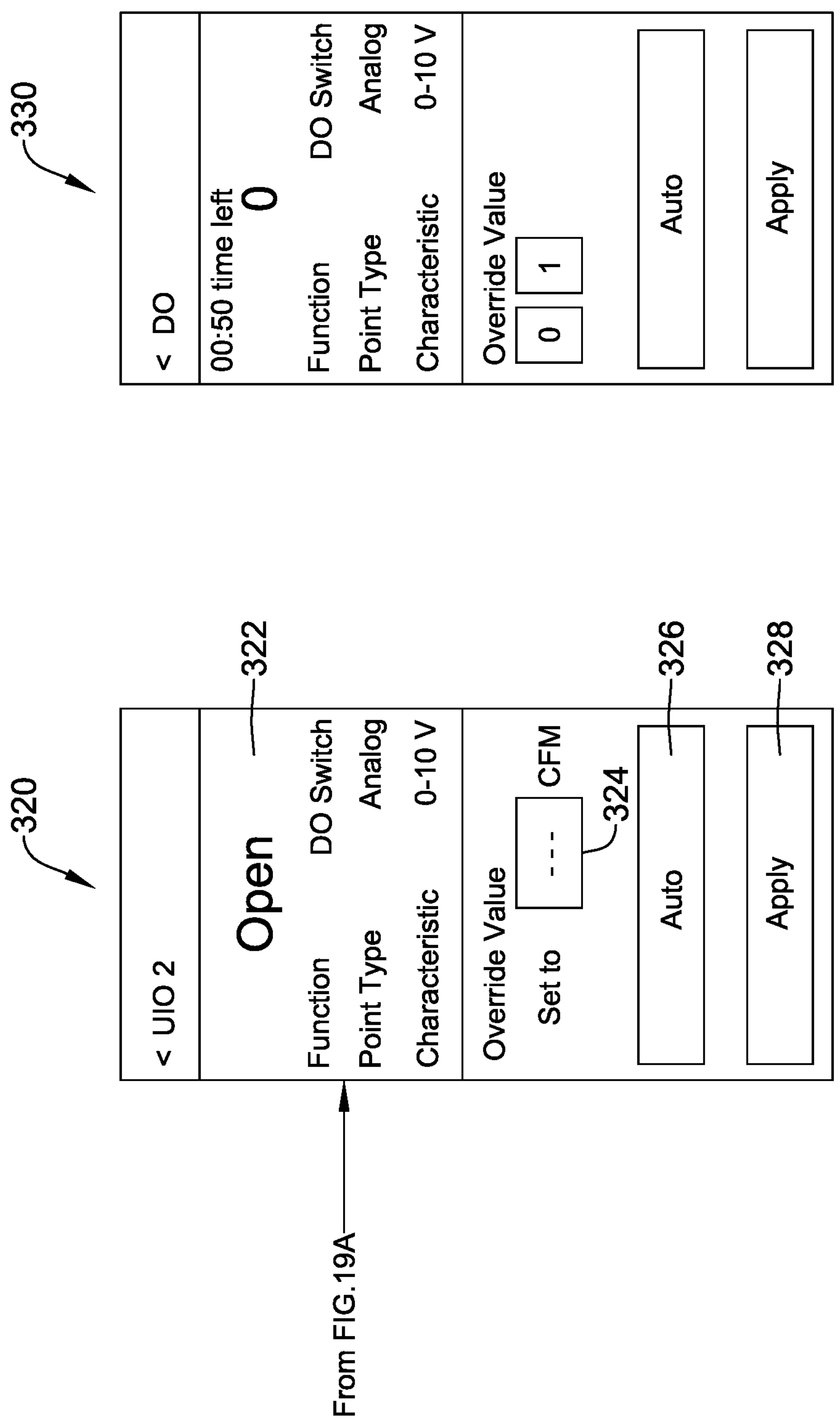

FIGS. 19A and 19B together provide several screens that may be displayed related to FHD UIO override. A first screen 300 includes an I/O button 302. Selecting the I/O button 302 causes the application program to display a screen 310 that includes a listing 312 of inputs and outputs of a selected Fume Hood (e.g. FHD_ROOM3_01), including an UIO 2 parameter 314. Selecting the UIO 2 parameter 314 cause the application program to display a screen 320 that provides more details regarding the UIO 2 terminal of the selected Fume Hood (e.g. FHD_ROOM3_01). In this example, this includes a block 322 providing more information regarding the UIO terminal, including its OPEN status, its function, its point type and its characteristic. The screen 320 includes an override box 324 that allows a user to enter an override value, an AUTO button 326 that causes the application program to revert to auto settings, and an APPLY button 328 that allows a user to instruct the application program to save the changes they have entered. A screen 330 provides an example of displaying information for a DO (Digital Output) output terminal of the selected Fume Hood (e.g. FHD_ROOM3_01), which is initiated by selecting the DO (Digital Output) output terminal via screen 310.

Figure 20:
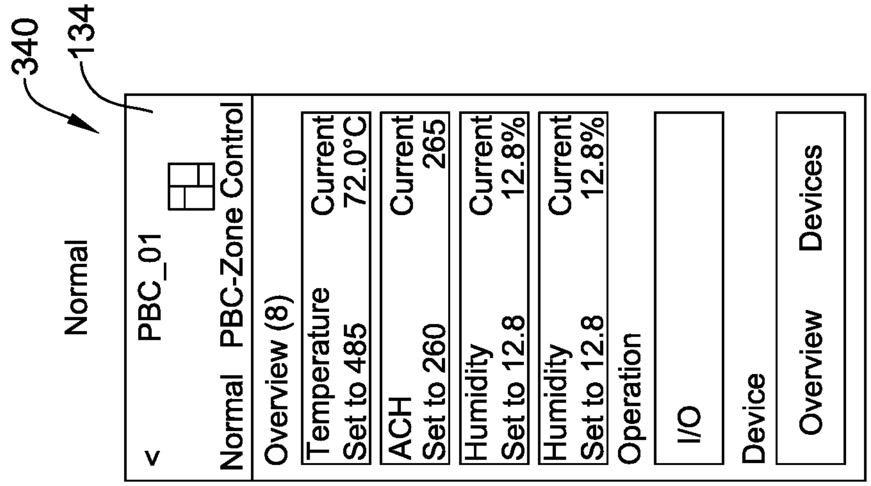
FIGS. 20, 21 and 22 provide schematic views of several screens, showing different status values.
Figure 21:
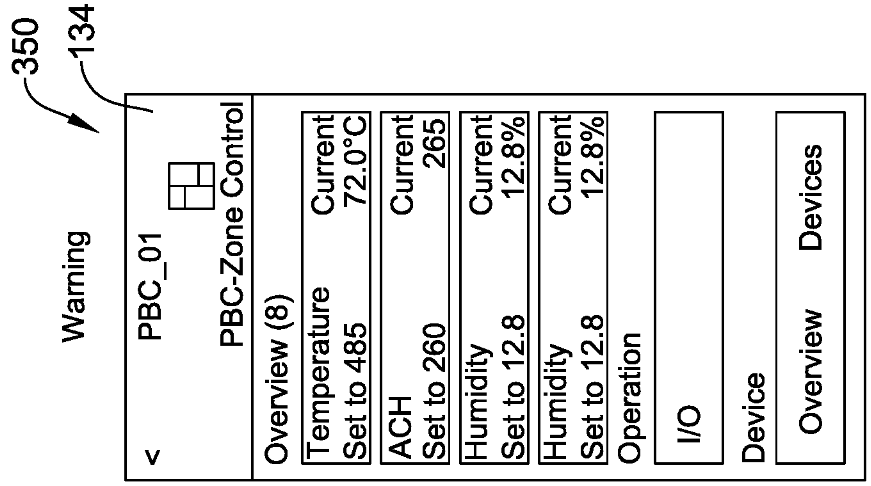
Figure 22:
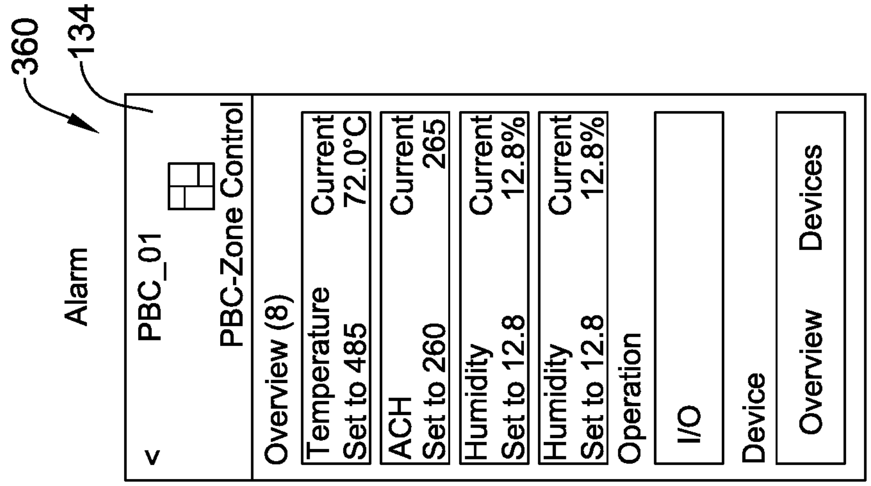

FIGS. 20, 21 and 22 provide schematic views of several screens, showing different status values for a programmable zone controller (e.g. PBC-01). FIG. 20 shows a screen 340 that is similar to the screen 130 shown in FIG. 5. As can be seen, the header bar 134 may be a first color, such as green, to indicate that all is well, with normal operation. FIG. 21 shows a screen 350 that is similar to the screen 130 shown in FIG. 5. As can be seen, the header bar 134 may be a second color, such as yellow, to indicate that non-critical issued have been detected, but normal operation is achieved. FIG. 22 shows a screen 360 that is similar to the screen 130 shown in FIG. 5. As can be seen, the header bar 134 may be a third color, such as red, to indicate that one or more critical issues have been detected. This color coding may provide the user of the mobile device with an intuitive way of quickly identifying the current status of the programmable zone controller (e.g. PBC-01), and in some cases, one or more air control devices operatively coupled to the programmable zone controller (e.g. PBC-01).

Figure 24:
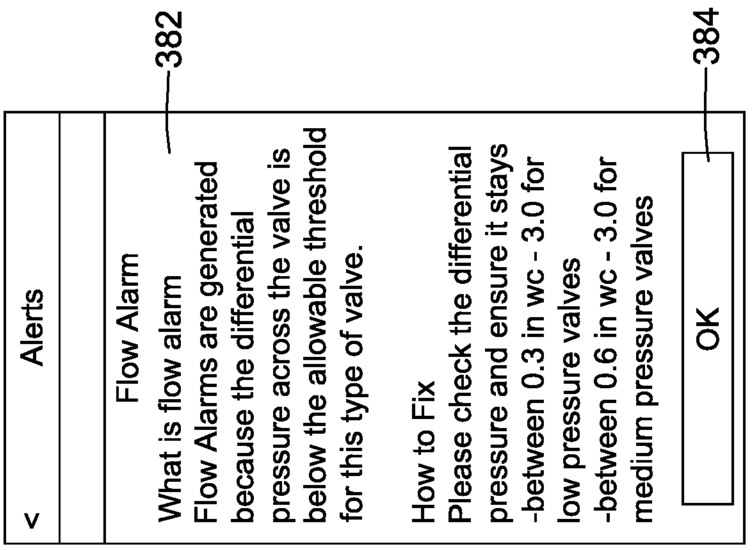
FIGS. 23 and 24 provide schematic views of several screens, showing illustrative alerts.
Figure 23:
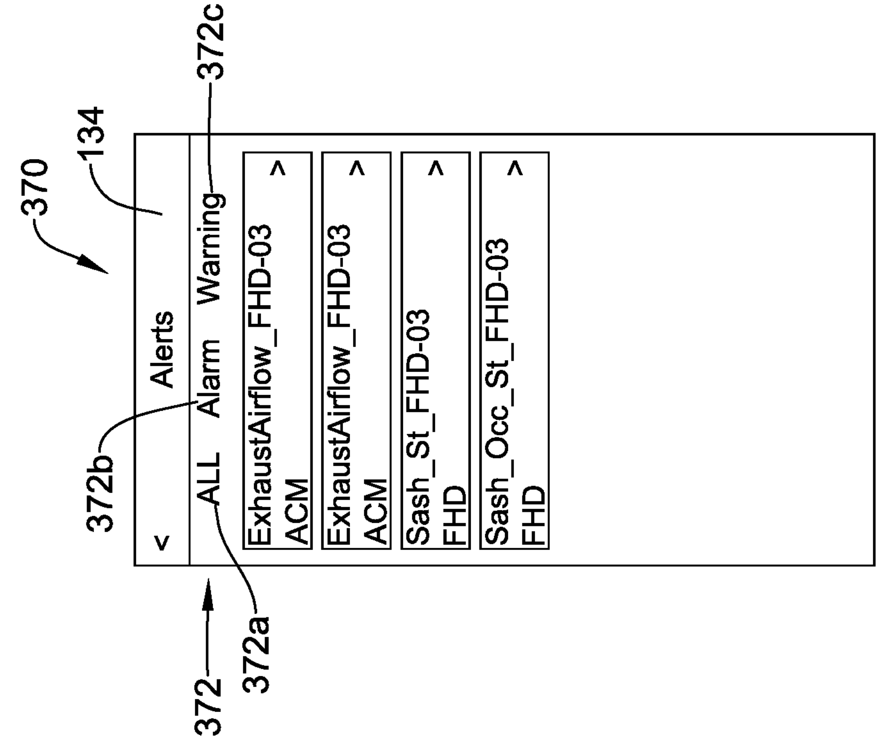

FIGS. 23 and 24 provide schematic views of several screens related to alerts and troubleshooting tips. FIG. 23 shows a screen 370 in which the header bar 134 displays ALERTS. The screen 370 includes a toolbar 372 having an ALL button 372*a*, an ALARM button 372*b* and a WARNING button 372*c*. The All button 372*a* has been selected. The screen 370 shows four alerts. Selecting one of the alerts causes the screen 380 to be displayed. The screen 380 is the same as the screen 370, but includes a superimposed pop-up 382 that provides additional information regarding the selected alert and in some cases information on how to fix the condition that caused the selected alert. The superimposed pop-up 382 includes an OK button 384 that a user can select to remove the superimposed pop-up 382.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method for monitoring at least part of a space of a building, wherein the space of the building includes a plurality of devices for controlling the environment of the space including a programmable zone controller operatively coupled to a plurality of air flow control devices of the space, the method comprising:

establishing a wireless connection between a mobile device and the programmable zone controller;

communicating, by the mobile device executing an application program, with the programmable zone controller via the wireless connection;

displaying, by the mobile device executing the application program, a zone dashboard on a display of the mobile device, wherein the zone dashboard includes a plurality of critical operating parameters associated with the programmable zone controller that are retrieved from the programmable zone controller via the wireless connection;

displaying, by the mobile device executing the application program, a listing of air flow control devices that are operatively coupled to the programmable zone controller;

referencing, by the mobile device executing the application program, one or more tiles for each of the plurality of air flow control devices, wherein each of the one or more tiles are locally stored on the mobile device and define the plurality of critical operating parameters that are to be displayed in response to a user of the mobile device selecting the corresponding one of the air flow control devices from the listing of air flow control devices; and displaying, by the mobile device executing the application program, the plurality of critical operating parameters associated with the selected air flow control device in response to the user of the mobile device selecting one of the air flow control devices from the listing of air flow control devices.

2. The method of claim 1, wherein the application program is configured to allow the user to customize each of the one or more tiles for one or more of the plurality of air flow control devices via a user interface of the mobile device.

3. The method of claim 1, wherein each of the one or more tiles for each of one or more of the plurality of air flow control devices is downloaded from the programmable zone controller to the mobile device via the wireless connection for subsequent reference by the application program.

4. The method of claim 1, wherein when the programmable zone controller is operatively coupled to one or more other programmable zone controller, the application program is configured to:

display a listing of the one or more other programmable zone controllers that are operably coupled to the programmable zone controller;

allow the user of the mobile device to select one of the other programmable zone controllers, and in response, display a plurality of critical operating parameters associated with the selected one of the other programmable zone controllers;

display a listing of air flow control devices that are operatively coupled to the selected one of the other programmable zone controllers; and allow the user of the mobile device to select one of the air flow control devices from the listing of air flow control devices that are operatively coupled to the selected one of the other programmable zone controllers, and in response, display a plurality of critical operating parameters associated with the selected air flow control device that is operatively coupled to the selected one of the other programmable zone controllers.

5. The method of claim 1, wherein the application program is configured to repeatedly update the display of the plurality of critical operating parameters associated with the programmable zone controller more frequently than once every 30 seconds.

6. The method of claim 1, wherein the application program is configured to repeatedly update the display of the plurality of critical operating parameters associated with the selected air flow control device more frequently than once every 30 seconds.

7. The method of claim 1, wherein the programmable zone controller is operatively coupled to the plurality of air flow control devices via a wired connection.

8. The method of claim 1, wherein the plurality of air flow control devices includes a fume hood.

9. The method of claim 1, wherein the application program is configured to allow the user of the mobile device to select one or more outputs of the programmable zone controller and/or one or more outputs of one or more of the plurality of air flow control devices for override, and to specify an override value for each of the one or more outputs selected for override.

10. The method of claim 9, wherein the application program is configured to notify the programmable zone controller via the wireless connection of the one or more outputs of the programmable zone controller and/or the one or more outputs of one or more of the plurality of air flow control devices selected for override, and the override value for each of the one or more outputs selected for override, causing the programmable zone controller and/or the one or more outputs of one or more of the plurality of air flow control devices to drive each of the one or more outputs selected for override to the corresponding override value.

11. The method of claim 10, wherein the application program is configured to allow the user of the mobile device to input an override duration, and to notify the programmable zone controller via the wireless connection of the override duration, causing the programmable zone controller and/or the one or more outputs of one or more of the plurality of air flow control devices to drive each of the one or more outputs selected for override to the corresponding override value for the override duration and then automatically relinquishing the override of the one or more outputs selected for override.

12. The method of claim 10, wherein the application program is configured to allow the user of the mobile device to manually relinquish the override of one or more of the outputs that are currently being driven by the programmable zone controller and/or the one or more outputs of one or more of the plurality of air flow control devices to a corresponding override value.

13. The method of claim 1, wherein one of the air flow control devices is a fume hood, and wherein the application program allows a user to set the fume hood into a hibernation mode, wherein in the hibernation mode a fume hood ventilation setting of the fume hood is set to an energy savings hibernation setting.

14. The method of claim 13, wherein the application program is configured to check whether a sash of the fume hood is fully closed before entering the hibernation mode, and if the sash is not fully closed, report to the user of the mobile device that the sash is not fully closed, and once the sash is fully closed, entering the hibernation mode.

15. The method of claim 1, wherein the application program is configured to visually display on the display of the mobile device a current status of the programmable zone controller, wherein the current status of the programmable zone controller is an aggregation of a status of the programmable zone controller and a status of each of the plurality of air flow control devices that are operably coupled to the programmable zone controller.

16. The method of claim 1, wherein the application program is configured to visually display on the display of the mobile device a listing of alarms associated with the programmable zone controller, wherein the listing of alarms associated with the programmable zone controller is an aggregation of alarms reported by the programmable zone controller and alarms reported by each of the plurality of air flow control devices that are operably coupled to the programmable zone controller.

17. The method of claim 16, wherein the application program is configured to allow the user of the mobile device to select a particular alarm from the listing of alarms, and in response, display additional information on the selected alarm.

18. A non-transitory computer readable medium storing instructions that when executed by one or more processors of a mobile device, causes the one or more processors of the mobile device to:

establish a wireless connection between the mobile device and a programmable zone controller;

communicate with the programmable zone controller via the wireless connection;

display a zone dashboard on a display of the mobile device, wherein the zone dashboard includes a plurality of critical operating parameters associated with the programmable zone controller that are retrieved from the programmable zone controller via the wireless connection;

display a listing of air flow control devices that are operatively coupled to the programmable zone controller;

reference a tile for each of the air flow control devices that are operatively coupled to the programmable zone controller, wherein each of the tiles are locally stored on the mobile device and define the plurality of critical operating parameters that are to be displayed in response to a user of the mobile device selecting the corresponding one of the air flow control devices from the listing of air flow control devices; and display the plurality of critical operating parameters defined by the tile that is associated with the selected air flow control device in response to the user of the mobile device to selecting one of the air flow control devices from the listing of air flow control devices.

19. A system comprising:

a programmable zone controller;

a plurality of air flow control devices operatively coupled to the programmable zone controller via a wired connection;

a mobile device operatively coupled to the programmable zone controller via a wireless connection, the mobile device executing an application program that is configured to:

communicate with the programmable zone controller via the wireless connection;

display a zone dashboard on a display of the mobile device, wherein the zone dashboard includes a plurality of critical operating parameters associated with the programmable zone controller that are retrieved from the programmable zone controller via the wireless connection;

display a listing of the plurality of air flow control devices that are operatively coupled to the programmable zone controller; and display a plurality of critical operating parameters associated with the selected air flow control device in response to the user of the mobile device selecting one of the air flow control devices from the listing of air flow control devices, wherein the plurality of critical operating parameters are defined in a programmable tile associated with the selected air flow control device downloaded from the programmable zone controller via a wireless connection and stored on the mobile device.

* * * * *